US012598095B2

(12) United States Patent
Heo et al.

(10) Patent No.: US 12,598,095 B2
(45) Date of Patent: Apr. 7, 2026

(54) DISPLAY DEVICE

(71) Applicant: LG ELECTRONICS INC., Seoul (KR)

(72) Inventors: Seunghyun Heo, Seoul (KR); Jiwon Do, Seoul (KR); Taehoon Kim, Seoul (KR); Kiwoong Lee, Seoul (KR); Jaekyung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 362 days.

(21) Appl. No.: 18/015,706

(22) PCT Filed: Jul. 14, 2020

(86) PCT No.: PCT/KR2020/009267
§ 371 (c)(1),
(2) Date: Jan. 11, 2023

(87) PCT Pub. No.: WO2022/014738
PCT Pub. Date: Jan. 20, 2022

(65) Prior Publication Data
US 2023/0261897 A1     Aug. 17, 2023

(51) Int. Cl.
*G10L 15/30*          (2013.01)
*G10L 15/08*          (2006.01)
(Continued)

(52) U.S. Cl.
CPC ............ *H04L 12/282* (2013.01); *G10L 15/08* (2013.01); *G10L 15/22* (2013.01); *G10L 2015/223* (2013.01)

(58) Field of Classification Search
None
See application file for complete search history.

(56) References Cited

U.S. PATENT DOCUMENTS

2003/0187659 A1   10/2003   Cho et al.
2015/0213355 A1    7/2015   Sharma et al.
(Continued)

FOREIGN PATENT DOCUMENTS

EP          3599605        1/2020
JP          2004354721     12/2004
(Continued)

OTHER PUBLICATIONS

PCT International Application No. PCT/KR2020/009267, International Search Report dated Mar. 31, 2021, 4 pages.
(Continued)

*Primary Examiner* — Seong-Ah A Shin
(74) *Attorney, Agent, or Firm* — LEE, HONG, DEGERMAN, KANG & WAIMEY

(57)          ABSTRACT

A display device according to as embodiment of the present disclosure may comprise: a display; a communication interface for receiving, from a first server, a connected device information set including information on each of multiple home appliances connected to the display device; and a processor for acquiring a voice signal corresponding to a voice command uttered by a user, transmitting voice data corresponding to the received voice signal and the connected device information set to a second server, receiving, from the second server, an intention analysis result for the voice command, determining, if home appliances of the same kind are included in the multiple home appliances, a home appliance matching the intention of the voice command from among the home appliances of the same kind on the basis of the received intention analysis result, and transmitting, to the first server, a control command for controlling the determined home appliance.

17 Claims, 19 Drawing Sheets

(51) Int. Cl.
  G10L 15/22            (2006.01)
  H04L 12/28            (2006.01)

(56)                References Cited

U.S. PATENT DOCUMENTS

| | | | | |
|---|---|---|---|---|
| 2017/0357637 | A1* | 12/2017 | Nell | G06F 40/35 |
| 2018/0068663 | A1* | 3/2018 | Choi | G10L 15/30 |
| 2018/0096683 | A1* | 4/2018 | James | G10L 15/30 |
| 2019/0096683 | A1* | 3/2019 | Sakuma | H10B 43/50 |
| 2019/0342727 | A1* | 11/2019 | Park | H04L 12/282 |
| 2020/0193982 | A1* | 6/2020 | Kim | G10L 25/84 |
| 2021/0037067 | A1* | 2/2021 | Lee | G10L 15/30 |
| 2021/0118582 | A1* | 4/2021 | Lee | G06F 3/167 |
| 2022/0310066 | A1* | 9/2022 | Choi | G06F 3/16 |

FOREIGN PATENT DOCUMENTS

| | | |
|---|---|---|
| KR | 100434545 | 6/2004 |
| KR | 20140046653 | 4/2014 |
| KR | 20180052876 | 5/2018 |

OTHER PUBLICATIONS

European Patent Office Application Serial No. 20945202.8, Search Report dated Mar. 14, 2024, 4 pages.

* cited by examiner

5

10
AI Server

20
Iot Server

Display Device

100

51   52   53   54   55

810
Name : BEDROOM AIR CONDITIONER
Location : Main Room
Type : device_aircon

830
Name : LIVING ROOM AIR CONDITIONER
Location : "NO INFORMATION "
Type : device_aircon 20
IoT Server

Figures 9, 10:
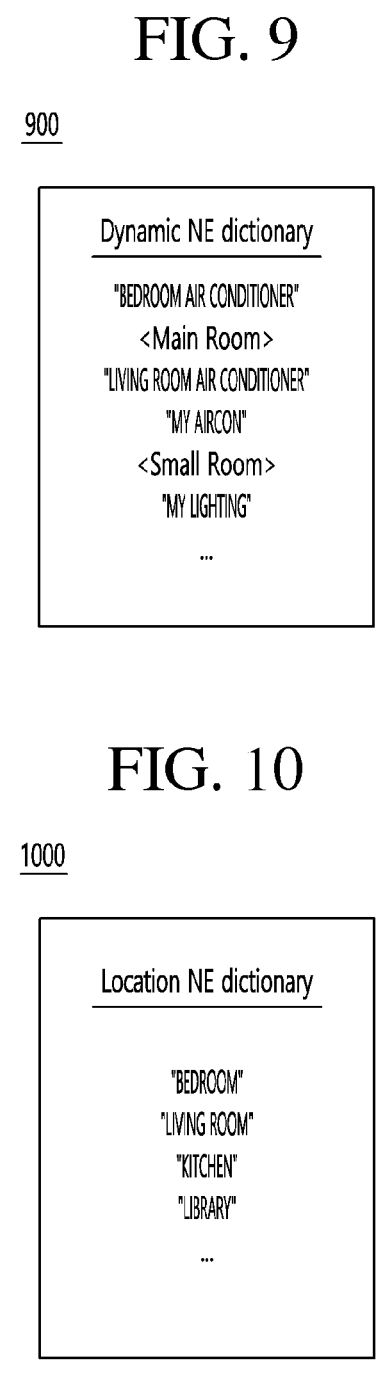

Dynamic NE dictionary

"BEDROOM AIR CONDITIONER"
<Main Room>
"LIVING ROOM AIR CONDITIONER"
"MY AIRCON"
<Small Room>
"MY LIGHTING"

Location NE dictionary

"BEDROOM"
"LIVING ROOM"
"KITCHEN"
"LIBRARY"

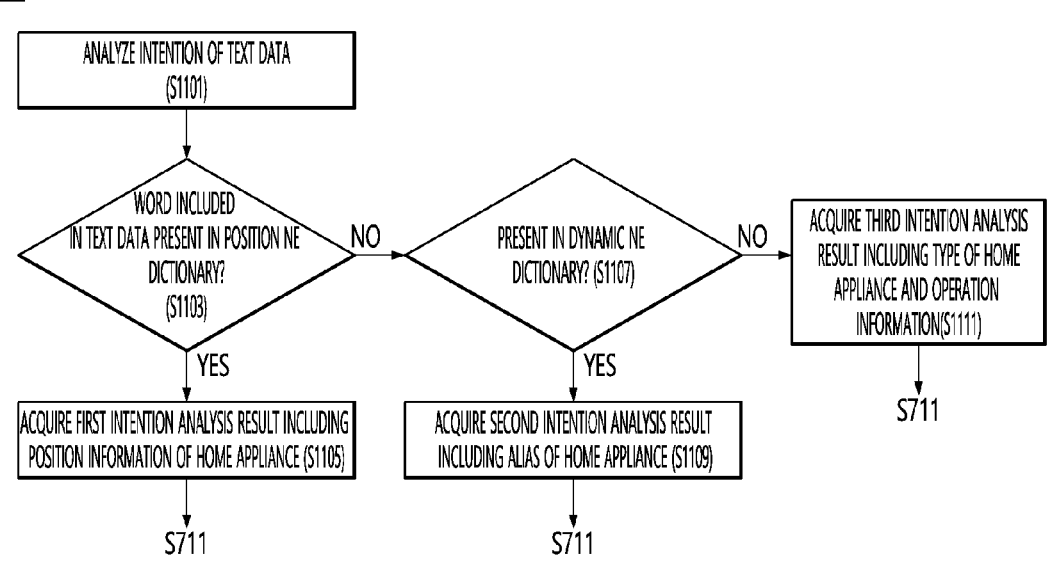

ANALYZE INTENTION OF TEXT DATA
(S1101)

WORD INCLUDED IN TEXT DATA PRESENT IN POSITION NE DICTIONARY? (S1103) — NO → PRESENT IN DYNAMIC NE DICTIONARY? (S1107) — NO → ACQUIRE THIRD INTENTION ANALYSIS RESULT INCLUDING TYPE OF HOME APPLIANCE AND OPERATION INFORMATION(S1111)

YES → ACQUIRE FIRST INTENTION ANALYSIS RESULT INCLUDING POSITION INFORMATION OF HOME APPLIANCE (S1105)

YES → ACQUIRE SECOND INTENTION ANALYSIS RESULT INCLUDING ALIAS OF HOME APPLIANCE (S1109)

HOME APPLIANCE TYPE: Light
PLACE INFORMATION : LIVING ROOM
OPERATION INFORMATION : power_on

1230

HOME APPLIANCE TYPE: Light
HOME APPLIANCE ALIAS : MY LIGHTING
OPERATION INFORMATION : power_on

1250

HOME APPLIANCE TYPE: Light
HOME APPLIANCE ALIAS :NONE
OPERATION INFORMATION : power_on

Figures 13, 14:
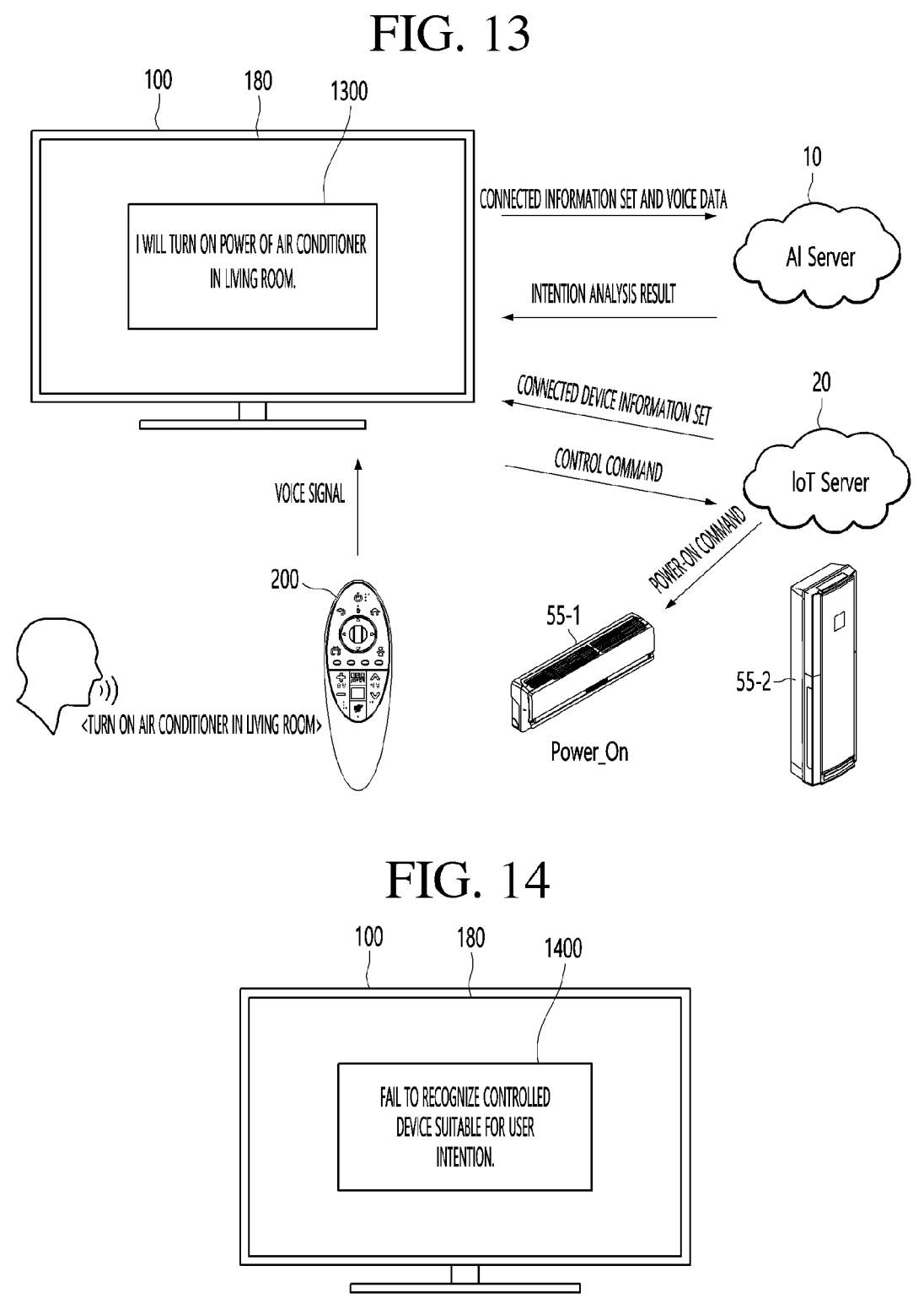

I WILL TURN ON POWER OF AIR CONDITIONER
IN LIVING ROOM.

CONNECTED INFORMATION SET AND VOICE DATA →

← INTENTION ANALYSIS RESULT

10

AI Server

← CONNECTED DEVICE INFORMATION SET

CONTROL COMMAND →

20

IoT Server

POWER-ON COMMAND

VOICE SIGNAL

200

<TURN ON AIR CONDITIONER IN LIVING ROOM>

55-1

Power_On 55-2

FAIL TO RECOGNIZE CONTROLLED
DEVICE SUITABLE FOR USER
INTENTION.

Figure 18:
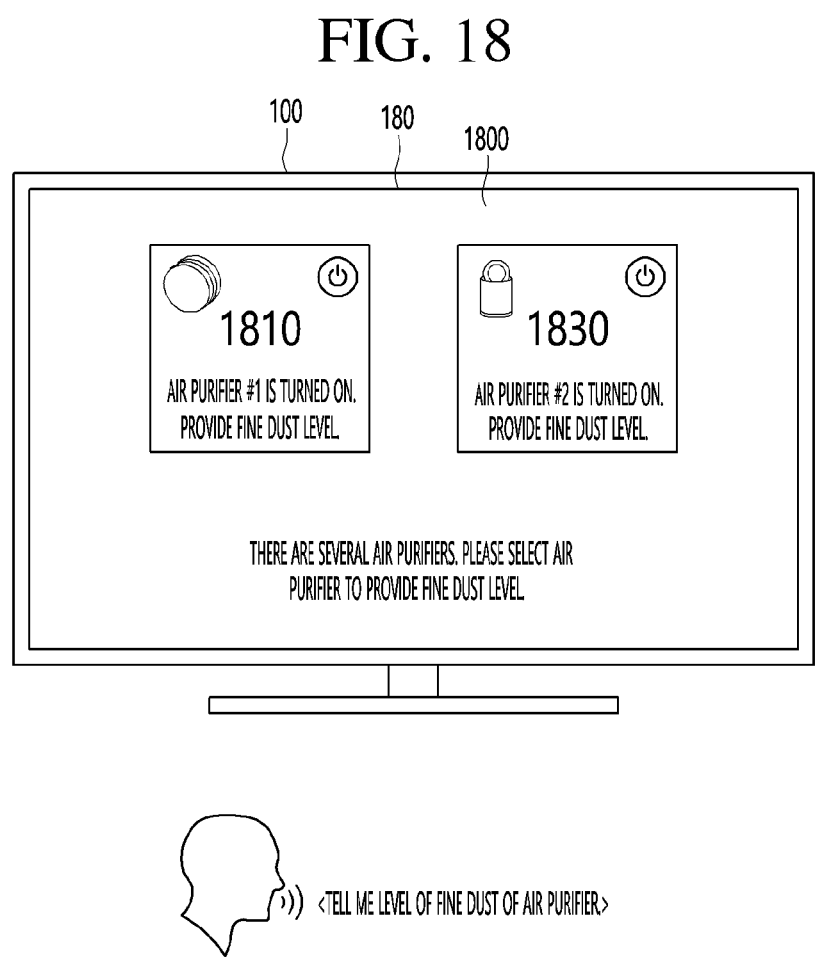

AIR PURIFIER #1 IS TURNED ON.
PROVIDE FINE DUST LEVEL.

1830

AIR PURIFIER #2 IS TURNED ON.
PROVIDE FINE DUST LEVEL.

THERE ARE SEVERAL AIR PURIFIERS. PLEASE SELECT AIR
PURIFIER TO PROVIDE FINE DUST LEVEL.

<TELL ME LEVEL OF FINE DUST OF AIR PURIFIER>

FIG. 19
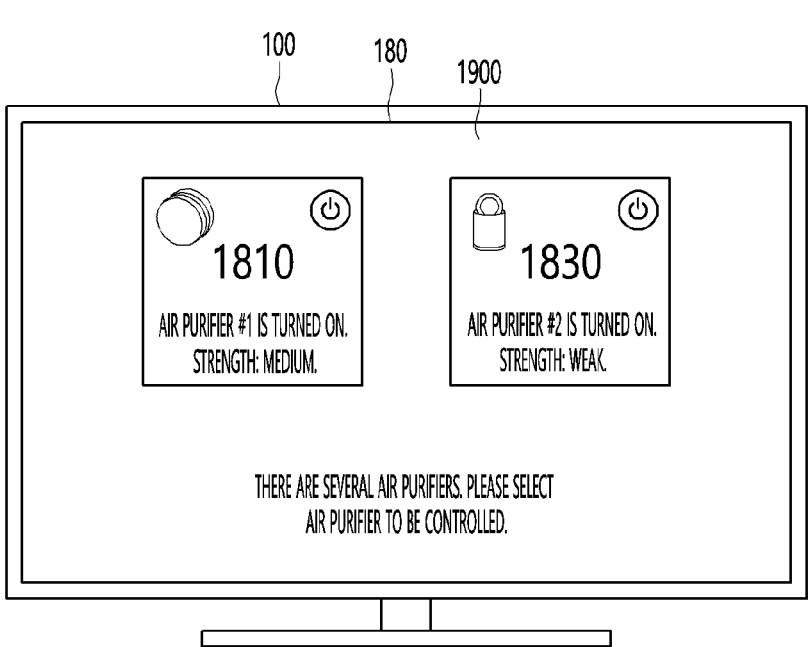
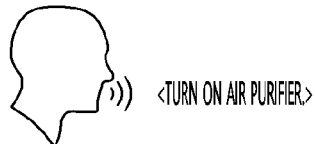 ⟨TURN ON AIR PURIFIER.⟩

100     180     2100

2110

AIR PURIFIER #1 IS TURNED
OFF. FINE DUST: 92

2130

AIR PURIFIER #2 IS TURNED
OFF. FINE DUST: 17

THERE ARE SEVERAL AIR PURIFIERS. PLEASE SELECT
AIR PURIFIER TO PROVIDE FINE DUST LEVEL

<TURN ON AIR PURIFIER STRONGLY>

DISPLAY DEVICE

CROSS-REFERENCE TO RELATED APPLICATIONS

This application is the National Stage filing under 35 U.S.C. 371 of International Application No. PCT/KR2020/009267, filed on Jul. 14, 2020, the contents of which are all incorporated by reference herein in their entirety.

TECHNICAL FIELD

The present disclosure relates to a display device for processing a voice command uttered by a user.

BACKGROUND ART

Digital TV services using wired or wireless communication networks are becoming common. Digital TV services are capable of providing various services that could not be provided by the existing analog broadcasting services.

For example, Internet Protocol Television (IPTV) and smart TV services, which are types of digital TV services, provide interactivity so that users may actively select the types of watching programs, the watching time, and the like. The IPTV and smart TV services may provide various additional services, such as Internet search, home shopping, and online games, based on such interactivity.

A recent display device such as a TV has a voice recognition service function of providing a function suitable for a voice in response to a voice uttered by a user.

In particular, in an IoT environment, a display device may receive a voice uttered by a user and control a peripheral device such as a home appliance.

In an environment where two or more homogeneous home appliances (air purifier, lighting, etc.) are installed in a house, it is not easy to control a desired appliance by voice.

For example, if there are multiple lightings in a house, if the user says <Turn on the lighting>, it is ambiguous whether it refers to a lighting in a living room or a living room.

DISCLOSURE

Technical Problem

An object of the present disclosure is to provide a display device for voice control of any one home appliance even in an environment where two or more homogeneous home appliances are installed.

An object of the present disclosure is to provide a display device capable of inducing selection of homogeneous home appliances in an order suitable for utterance intention of a user in an environment in which two or more homogeneous home appliances are connected to the display device.

Technical Solution

According to an embodiment of the present disclosure, a display device includes a display, a communication interface configured to receive a connection device information set including information on each of a plurality of home appliances connected to the display device, from a first server, and a processor configured to acquire a voice signal corresponding to a voice command uttered a user, transmit voice data corresponding to a received voice signal and the connection device information set to a second server, receive an intention analysis result of the voice command from the second server, determine a home appliance corresponding to intention of the voice command among homogeneous home appliances based on the received intention analysis result when homogeneous home appliances among the plurality of home appliances are included, and transmit control command for controlling the determined home appliance to the first server.

According to another embodiment of the present disclosure, a display device includes a display, a communication interface configured to receive a connection device information set including information on each of plurality of home appliances connected to the display device, from a first server, and a processor configured to acquire a voice signal corresponding to a voice command uttered by a user, transmit voice data corresponding to a received voice signal and the connection device information set to a second server, receive an intention analysis result of the voice command from the second server, and display homogeneous home appliance items corresponding to homogeneous home appliances corresponding to intention of the voice command on the display based on a received intention analysis result when the homogeneous home appliances among the plurality of home appliances is included.

Advantageous Effects

According to various embodiments of the present disclosure, a user may easily perform voice control on a controlled device even in an environment where two or more homogeneous home appliances are installed.

According to various embodiments of the present disclosure, even if a user does not remember an alias of a home appliance, the user may easily control a desired home appliance among homogeneous home appliances.

DESCRIPTION OF DRAWINGS

FIG. 9 is a diagram for explaining an example of a dynamic NE dictionary generated based on a connection device information set according to an embodiment of the present disclosure.

FIG. 10 is a diagram for explaining an example of a position NE dictionary according to an embodiment of the present disclosure.

FIG. 11 is a flowchart for explaining a procedure of acquiring an intention analysis result by an AI server according to an embodiment of the present disclosure, and FIG. 12 is a diagram showing an example of various types of intention analysis results.

FIG. 13 is a diagram for explaining a procedure of controlling any one home appliance through a voice command of a user when homogeneous home appliances are connected to a display device according to an embodiment of the present disclosure.

FIG. 14 is a diagram for explaining an example of outputting notification of device control failure when there is no home appliance corresponding to intention of a voice command of a user according to an embodiment of the present disclosure.

FIG. 16 is a diagram for explaining a processing method when there is a plurality of controlled devices according to a voice command uttered by a user according to an embodiment of the present disclosure.

FIG. 18 is a diagram for explaining an example in which only a device suitable for operation intention of a voice command among a plurality of homogeneous devices when there are a plurality of controlled devices based on a voice command uttered by a user according to another embodiment of the present disclosure.

FIG. 19 is a diagram for explaining an example in which only a device corresponding to operation intention of a voice command among a plurality of homogeneous devices is exposed when there are a plurality of controlled device based on a voice command uttered by a user according to another embodiment of the present disclosure.

BEST MODE

Hereinafter, embodiments relating to the present disclosure will be described in detail with reference to the drawings. The suffixes "module" and "unit" for components used in the description below are assigned or mixed in consideration of easiness in writing the specification and do not have distinctive meanings or roles by themselves.

A display device according to an embodiment of the present disclosure is, for example, an intelligent display device that adds a computer supporting function to a broadcast receiving function, and may have an easy-to-use interface such as a writing input device, a touch screen, or a spatial remote control device as an Internet function is added while fulfilling the broadcast receiving function. Then, with the support of a wired or wireless Internet function, it is possible to perform an e-mail, web browsing, banking, or game function in access to Internet and computers. In order to perform such various functions, standardized general purpose OS may be used.

Accordingly, since various applications are freely added or deleted on a general purpose OS kernel, a display device described herein, for example, may perform various user-friendly functions. The display device, in more detail, may be a network TV, Hybrid Broadcast Broadband TV (HBBTV), smart TV, light-emitting diode (LED) TV, organic light-emitting diode (OLED) TV, and so on and in some cases, may be applied to a smartphone.

Figure 1:
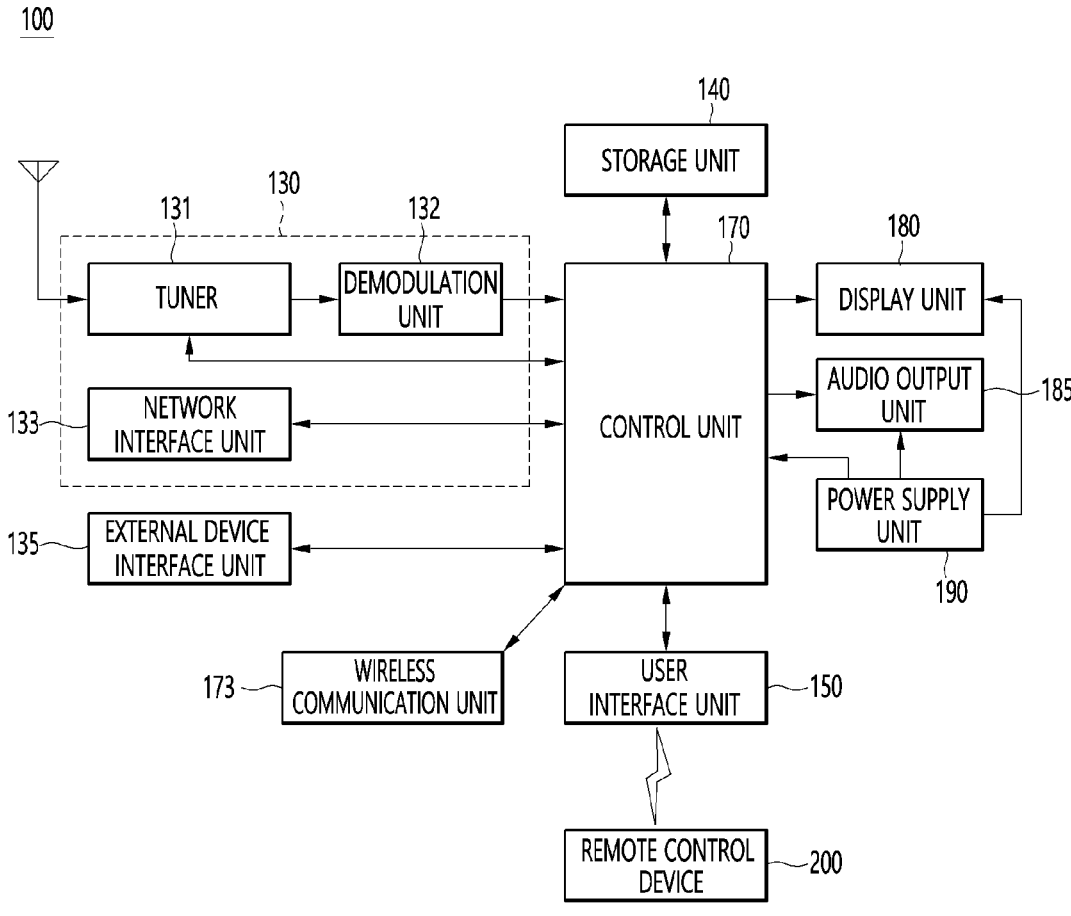
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 may include a broadcast receiver 130, an external device interface 135, a storage 140, a user interface 150, a controller 170, a wireless communication interface 173, a display 180, an audio output interface 185, and a power supply 190.

The broadcast receiver 130 may include a tuner 131, a demodulator 132, and a network interface 133.

The tuner 131 may select a specific broadcast channel according to a channel selection command. The tuner 131 may receive broadcast signals for the selected specific broadcast channel.

The demodulator 132 may divide the received broadcast signals into video signals, audio signals, and broadcast program-related data signals, and may restore the divided video signals, audio signals, and data signals into the form capable of being output.

The external device interface 135 may receive an application or an application list in an adjacent external device, and may transmit the application or the application list to the controller 170 or the storage 140.

The external device interface 135 may provide a connection path between the display device 100 and the external device. The external device interface 135 may receive at least one an image or audio output from the external device that is wirelessly or wiredly connected to the display device 100, and may transmit the image and/or the audio to the controller 170. The external device interface 135 may include a plurality of external input terminals. The plurality of external input terminals may include an RGB terminal, at least one High Definition Multimedia Interface (HDMI) terminal, and a component terminal.

An image signal of the external device input through the external device interface 135 may be output through the display 180. A voice signal of the external device input through the external device interface 135 may be output through the audio output interface 185.

An external device connectable to the external device interface 135 may be one of a set-top box, a Blu-ray player, a DVD player, a game console, a sound bar, a smartphone, a PC, a USB memory, and a home theater system, but this is just exemplary.

The network interface 133 may provide an interface for connecting the display device 100 to a wired/wireless network including an Internet network. The network interface 133 may transmit or receive data to or from another user or another electronic device through an accessed network or another network linked to the accessed network.

In addition, some content data stored in the display device 100 may be transmitted to a user or an electronic device, which is selected from other users or other electronic devices preregistered in the display device 100.

The network interface 133 may access a predetermined webpage through an accessed network or another network linked to the accessed network. That is, the network interface 133 may transmit or receive data to or from a corresponding server by accessing a predetermined webpage through the network.

The network interface 133 may receive content or data provided from a content provider or a network operator. That is, the network interface 133 may receive content, such as movies, advertisements, games, VODs, and broadcast signals, which are provided from the content provider or the network operator, and information relating thereto through the network.

In addition, the network interface 133 may receive firmware update information and update files provided from the network operator, and may transmit data to the Internet or content provider or the network operator.

The network interface 133 may select and receive a desired application among applications open to the air, through the network.

The storage 140 may store signal-processed image, voice, or data signals stored by a program in order for each signal processing and control in the controller 170.

In addition, the storage 140 may perform a function for temporarily storing image, voice, or data signals output from the external device interface 135 or the network interface 133, and may store information on a predetermined image through a channel memory function.

The storage 140 may store an application or an application list input from the external device interface 135 or the network interface 133.

The display device 100 may play content files (e.g., video files, still image files, music files, document files, application files, etc.) stored in the storage 140, and may provide the content files to a user.

The user input interface 150 may transmit signals input by a user to the controller 170, or may transmit signals from the controller 170 to a user. For example, the user input interface 150 may receive or process control signals such as power on/off, channel selection, and screen setting from a remote control device 200 or transmit control signals from the controller 170 to the remote control device 200 according to various communication methods such as Bluetooth, Ultra Wideband (WB), ZigBee, Radio Frequency (RF), and IR communication methods.

In addition, the user input interface 150 may transmit, to the controller 170, control signals input from local keys (not shown) such as a power key, a channel key, a volume key, and a setting key.

Image signals that are image-processed by the controller 170 may be input to the display 180 and displayed as images corresponding to the image signals. In addition, image signals that are image-processed by the controller 170 may be input to an external output device through the external device interface 135.

Voice signals processed by the controller 170 may be output to the audio output interface 185. In addition, voice signals processed by the controller 170 may be input to the external output device through the external device interface 135.

Additionally, the controller 170 may control overall operations of the display device 100.

In addition, the controller 170 may control the display device 100 by a user command or an internal program input through the user input interface 150, and may access the network to download a desired application or application list into the display device 100.

The controller 170 may output channel information selected by a user together with the processed image or voice signals through the display 180 or the audio output interface 185.

In addition, the controller 170 may output image signals or voice signals of an external device such as a camera or a camcorder, which are input through the external device interface 135, through the display 180 or the audio output interface 185, according to an external device image playback command received through the user input interface 150.

Moreover, the controller 170 may control the display 180 to display images, and may control the display 180 to display broadcast images input through the tuner 131, external input images input through the external device interface 135, images input through the network interface, or images stored in the storage 140. In this case, an image displayed on the display 180 may be a still image or video and also may be a 2D image or a 3D image.

Additionally, the controller 170 may play content stored in the display device 100, received broadcast content, and external input content input from the outside, and the content may be in various formats such as broadcast images, external input images, audio files, still images, accessed web screens, and document files.

Moreover, the wireless communication module 173 may perform wired or wireless communication with an external device. The wireless communication module 173 may perform short-range communication with an external device. For this, the wireless communication interface 173 may support short-range communication by using at least one of Bluetooth™, Radio Frequency Identification (RFID), Infrared Data Association (IrDA), Ultra Wideband (UWB), Zig-Bee, Near Field Communication (NFC), Wireless-Fidelity (Wi-Fi), Wi-Fi Direct, and Wireless Universal Serial Bus (USB) technologies. The wireless communication module 173 may support wireless communication between the display device 100 and a wireless communication system, between the display device 100 and another display device 100, or between networks including the display device 100 and another display device 100 (or an external server) through wireless area networks. The wireless area networks may be wireless personal area networks.

Herein, the other display device 100 may be a mobile terminal such as a wearable device (for example, a smart watch, a smart glass, and a head mounted display (HMD)) or a smartphone, which is capable of exchanging data (or inter-working) with the display device 100. The wireless communication module 173 may detect (or recognize) a wearable device capable of communication around the display device 100. Furthermore, if the detected wearable device is a device authenticated to communicate with the display device 100, the controller 170 may transmit at least part of data processed in the display device 100 to the wearable device through the wireless communication interface 173. Therefore, a user of the wearable device may use the data processed by the display device 100 through the wearable device.

The display 180 may convert image signals, data signals, or on-screen display (OSD) signals, which are processed in the controller 170, or images signals or data signals, which are received in the external device interface 135, into R, G, and B signals to generate driving signals.

Furthermore, the display device 100 shown in FIG. 1 is just one embodiment of the present disclosure and thus, some of the components shown may be integrated, added, or omitted according to the specification of the actually implemented display device 100.

That is, if necessary, two or more components may be integrated into one component or one component may be divided into two or more components and configured. Additionally, a function performed by each block is to describe an embodiment of the present disclosure and its specific operation or device does not limit the scope of the present disclosure.

According to another embodiment of the present disclosure, unlike FIG. 1, the display device 100 may receive images through the network interface 133 or the external device interface 135 and play them without including the tuner 131 and the demodulator 132.

For example, the display device 100 may be divided into an image processing device such as a set-top box for receiving broadcast signals or contents according to various network services and a content playback device for playing contents input from the image processing device.

In this case, an operating method of a display device according to an embodiment of the present disclosure described below may be performed by one of the display device described with reference to FIG. 1, an image processing device such as the separated set-top box, and a content playback device including the display 180 and the audio output interface 185.

A remote control device according to an embodiment of the present disclosure will be described with reference to FIGS. 2 and 3.

Figure 2:
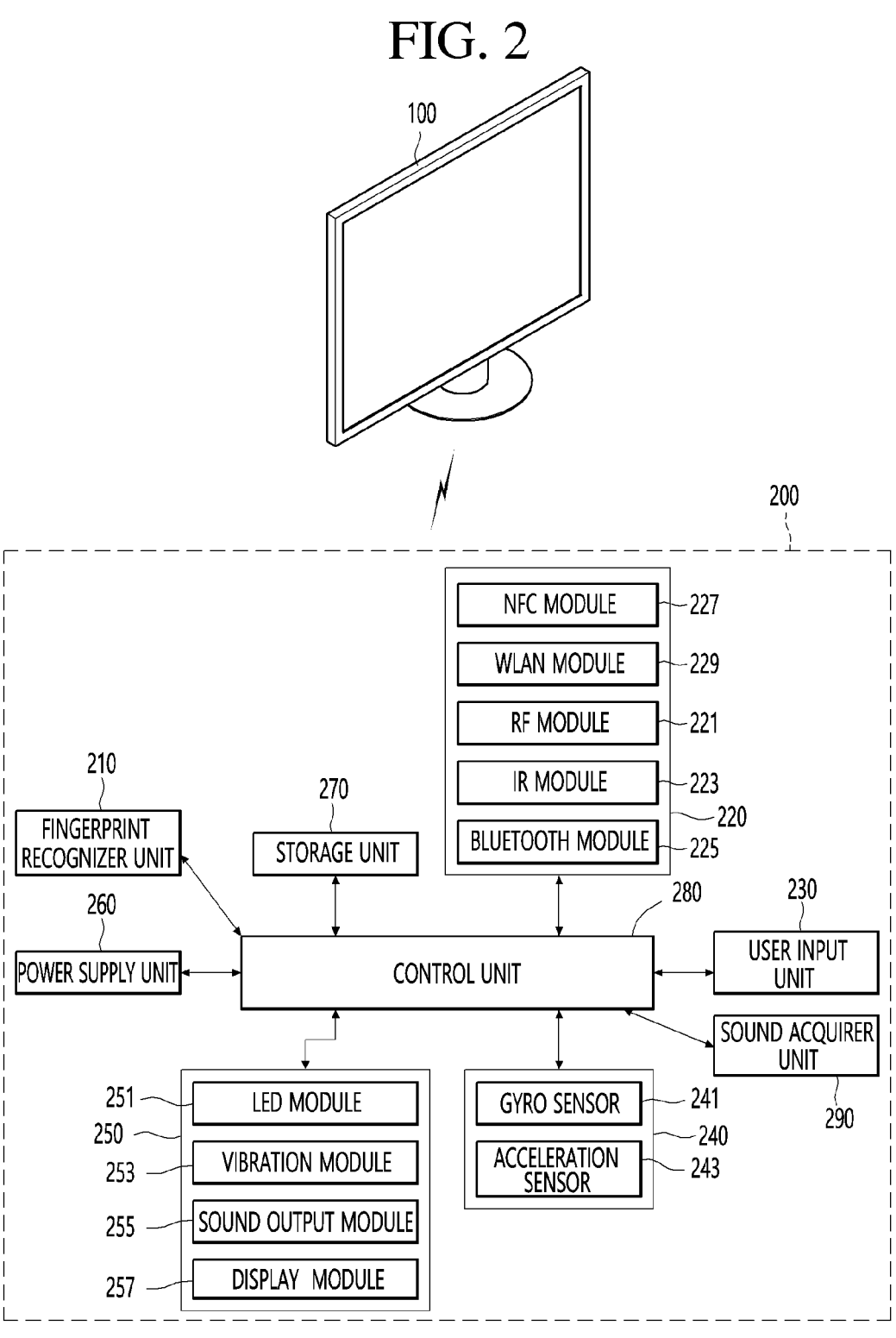
FIG. 2 is a block diagram illustrating a remote control device according to an embodiment of the present disclosure.
Figure 3:
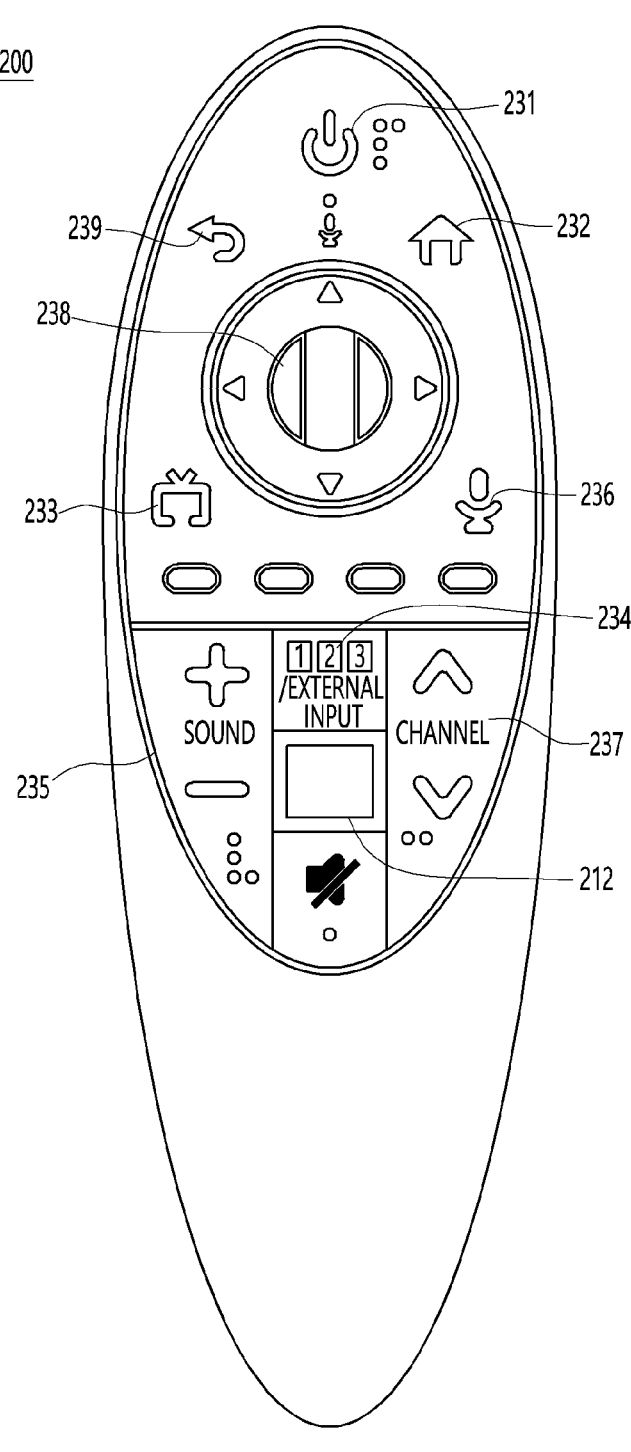
FIG. 3 is a view illustrating an actual configuration of a remote control device according to an embodiment of the present disclosure.

FIG. 2 is a block diagram illustrating a remote control device according to an embodiment of the present disclosure and FIG. 3 is a view illustrating an actual configuration of a remote control device according to an embodiment of the present disclosure.

First, referring to FIG. 2, a remote control device 200 may include a fingerprint recognizer 210, a wireless communication module 220, a user input interface 230, a sensor module 240, an output interface 250, a power supply 260, a storage 270, a controller 280, and a voice acquirer 290.

Referring to FIG. 2, the wireless communication interface 220 transmits/receives signals to/from an arbitrary any one of display devices according to the above-mentioned embodiments of the present disclosure.

The remote control device 200 may include a radio frequency (RF) module 221 capable of transmitting or receiving signals to or from the display device 100 according to an RF communication standard, and an IR module 223 capable of transmitting or receiving signals to or from the display device 100 according to an IR communication standard. In addition, the remote control device 200 may include a Bluetooth module 225 capable of transmitting or receiving signals to or from the display device 100 according to a Bluetooth communication standard. In addition, the remote control device 200 may include an NFC module 227 capable of transmitting or receiving signals to or from the display device 100 according to an NFC communication standard, and a wireless LAN (WLAN) module 229 capable of transmitting or receiving signals to or from the display device 100 according to a WLAN communication standard.

In addition, the remote control device 200 may transmit signals containing information on the movement of the remote control device 200 to the display device 100 through the wireless communication module 220.

Moreover, the remote control device 200 may receive signals transmitted from the display device 100 through the RF module 221 and if necessary, may transmit a command for power on/off, channel change, and volume change to the display device 100 through the IR module 223.

The user input interface 230 may be configured with a keypad, a button, a touch pad, or a touch screen. A user may operate the user input interface 230 to input a command relating to the display device 100 to the remote control device 200. If the user input interface 230 includes a hard key button, a user may input a command relating to the display device 100 to the remote control device 200 through the push operation of the hard key button. This will be described with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a volume control button 235, a voice recognition button 236, a channel change button 237, an OK button 238, and a back button 239.

The fingerprint recognition button 212 may be a button for recognizing a user's fingerprint. According to an embodiment of the present disclosure, the fingerprint recognition button 212 may perform a push operation and receive a push operation and a fingerprint recognition operation. The power button 231 may be a button for turning on/off the power of the display device 100. The home button 232 may be a button for moving to the home screen of the display device 100. The live button 233 may be a button for displaying live broadcast programs. The external input button 234 may be a button for receiving an external input connected to the display device 100. The volume control button 235 may be a button for controlling a volume output from the display device 100. The voice recognition button 236 may be a button for receiving user's voice and recognizing the received voice. The channel change button 237 may be a button for receiving broadcast signals of a specific broadcast channel. The OK button 238 may be a button for selecting a specific function, and the back button 239 may be a button for returning to a previous screen.

FIG. 2 is described again.

If the user input interface 230 includes a touch screen, a user may touch a soft key of the touch screen to input a command relating to the display device 100 to the remote control device 200. In addition, the user input interface 230 may include various kinds of input interfaces operable by a user, for example, a scroll key and a jog key, and this embodiment does not limit the scope of the present disclosure.

The sensor module 240 may include a gyro sensor 241 or an acceleration sensor 243. The gyro sensor 241 may sense information on the movement of the remote control device 200.

For example, the gyro sensor 241 may sense information on an operation of the remote control device 200 on the basis of x, y, and z axes and the acceleration sensor 243 may sense information on a movement speed of the remote control device 200. Moreover, the remote control device 200 may further include a distance measurement sensor that senses a distance with respect to the display 180 of the display device 100.

The output interface 250 may output image or voice signals in response to the operation of the user input interface 235, or may output image or voice signals corresponding to signals transmitted from the display device 100. A user may recognize whether the user input interface 235 is operated or the display device 100 is controlled through the output interface 250.

For example, the output interface 250 may include an LED module 251 for flashing, a vibration module 253 for generating vibration, a sound output module 255 for outputting sound, or a display module 257 for outputting an image, if the user input interface 235 is manipulated or signals are transmitted/received to/from the display device 100 through the wireless communication interface 225.

Additionally, the power supply 260 supplies power to the remote control device 200 and if the remote control device 200 does not move for a predetermined time, stops the power supply, so that power waste may be reduced. The power supply 260 may resume the supply of power if a predetermined key provided at the remote control device 200 is operated.

The storage 270 may store various kinds of programs and application data required to control or operate the remote control device 200. If the remote control device 200 transmits/receives signals wirelessly through the display device 100 and the RF module 221, the remote control device 200 and the display device 100 transmits/receives signals through a predetermined frequency band.

The controller 280 of the remote control device 200 may store, in the storage 270, information on a frequency band for transmitting/receiving signals to/from the display device 100 paired with the remote control device 200 and refer to it.

The controller 280 controls general matters relating to the control of the remote control device 200. The controller 280 may transmit a signal corresponding to a predetermined key operation of the user input interface 235 or a signal corresponding to the movement of the remote control device 200 sensed by the sensor module 240 to the display device 100 through the wireless communication module 225.

In addition, the voice acquirer 290 of the remote control device 200 may acquire voice.

The voice acquirer 290 may include at least one microphone and acquire voice through the microphone.

Figure 4:
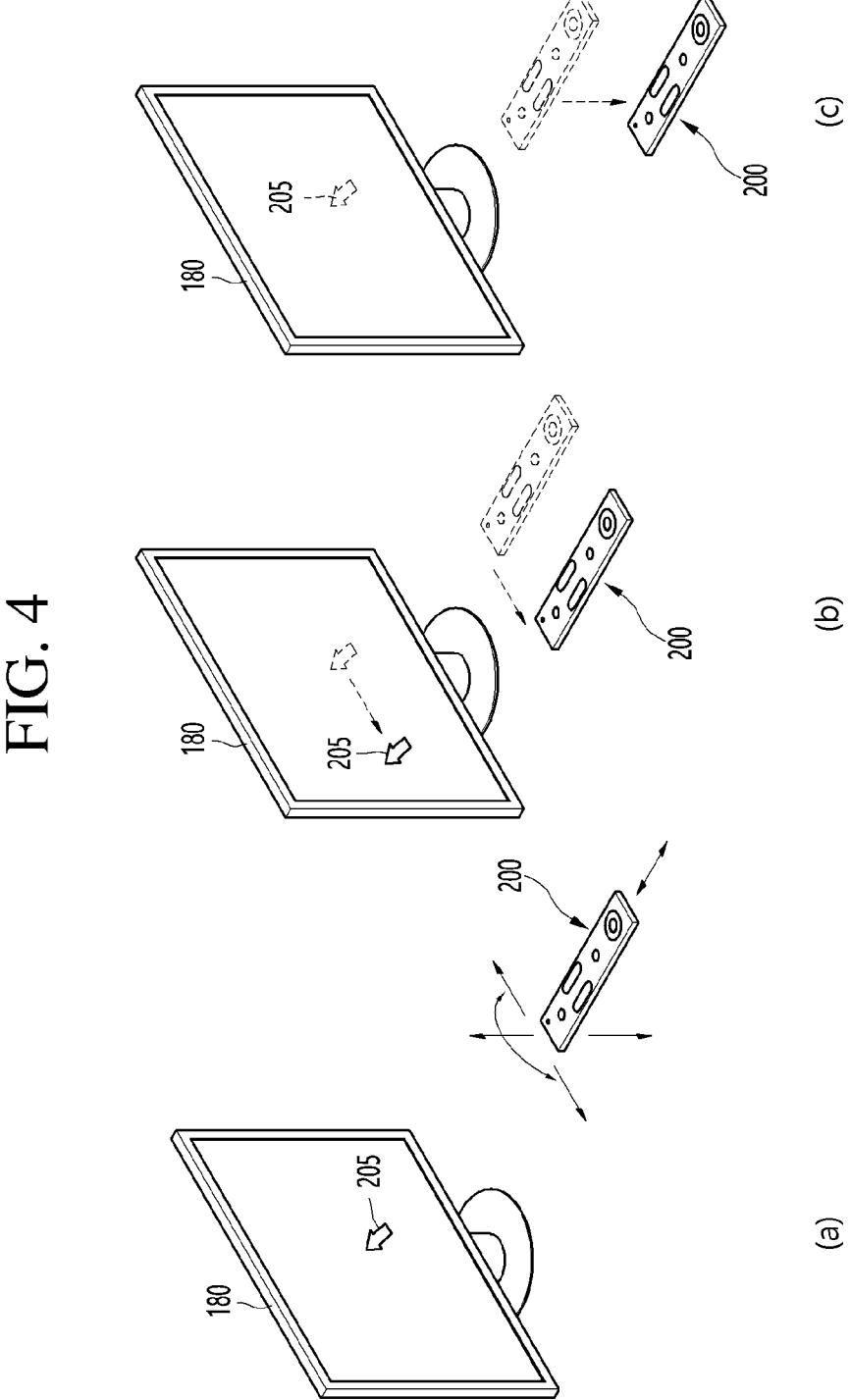
FIG. 4 is a view illustrating an example of utilizing a remote control device according to an embodiment of the present disclosure.

Next, FIG. 4 is described.

FIG. 4 is a view illustrating an example of utilizing a remote control device according to an embodiment of the present disclosure.

FIG. 4(*a*) illustrates that a pointer 205 corresponding to the remote control device 200 is displayed on the display 180.

A user may move or rotate the remote control device 200 vertically or horizontally. The pointer 205 displayed on the display 180 of the display device 100 corresponds to a movement of the remote control device 200. Since the corresponding pointer 205 is moved and displayed according to a movement on a 3D space as show in the drawing, the remote control device 200 may be referred to as a spatial remote control device.

FIG. 4(*b*) illustrates that if a user moves the remote control device 200, the pointer 205 displayed on the display 180 of the display device 100 is moved to the left according to the movement of the remote control device 200.

Information on a movement of the remote control device 200 detected through a sensor of the remote control device 200 is transmitted to the display device 100. The display device 100 may calculate the coordinates of the pointer 205 from the information on the movement of the remote control device 200. The display device 100 may display the pointer 205 to match the calculated coordinates.

FIG. 4(*c*) illustrates that while a specific button in the remote control device 200 is pressed, a user moves the remote control device 200 away from the display 180. Thus, a selected region in the display 180 corresponding to the pointer 205 may be zoomed in and displayed in an enlarged size.

On the other hand, if a user moves the remote control device 200 close to the display 180, a selection area in the display 180 corresponding to the pointer 205 may be zoomed out and displayed in a reduced size.

On the other hand, if the remote control device 200 is moved away from the display 180, a selection area may be zoomed out and if the remote control device 200 is moved closer to the display 180, a selection area may be zoomed in.

Additionally, if a specific button in the remote control device 200 is pressed, recognition of a vertical or horizontal movement may be excluded. That is, if the remote control device 200 is moved away from or closer to the display 180, the up, down, left, or right movement may not be recognized and only the back and forth movement may be recognized. While a specific button in the remote control device 200 is not pressed, only the pointer 205 is moved according to the up, down, left or right movement of the remote control device 200.

Moreover, the moving speed or moving direction of the pointer 205 may correspond to the moving speed or moving direction of the remote control device 200.

Furthermore, a pointer in this specification means an object displayed on the display 180 in response to an operation of the remote control device 200. Therefore, in addition to the arrow form displayed as the pointer 205 in the drawing, various forms of objects are possible. For example, the above concept includes a point, a cursor, a prompt, and a thick outline. Then, the pointer 205 may be displayed in correspondence to one point of a horizontal axis and a vertical axis on the display 180 and also may be displayed in correspondence to a plurality of points such as a line and a surface.

Figure 5:
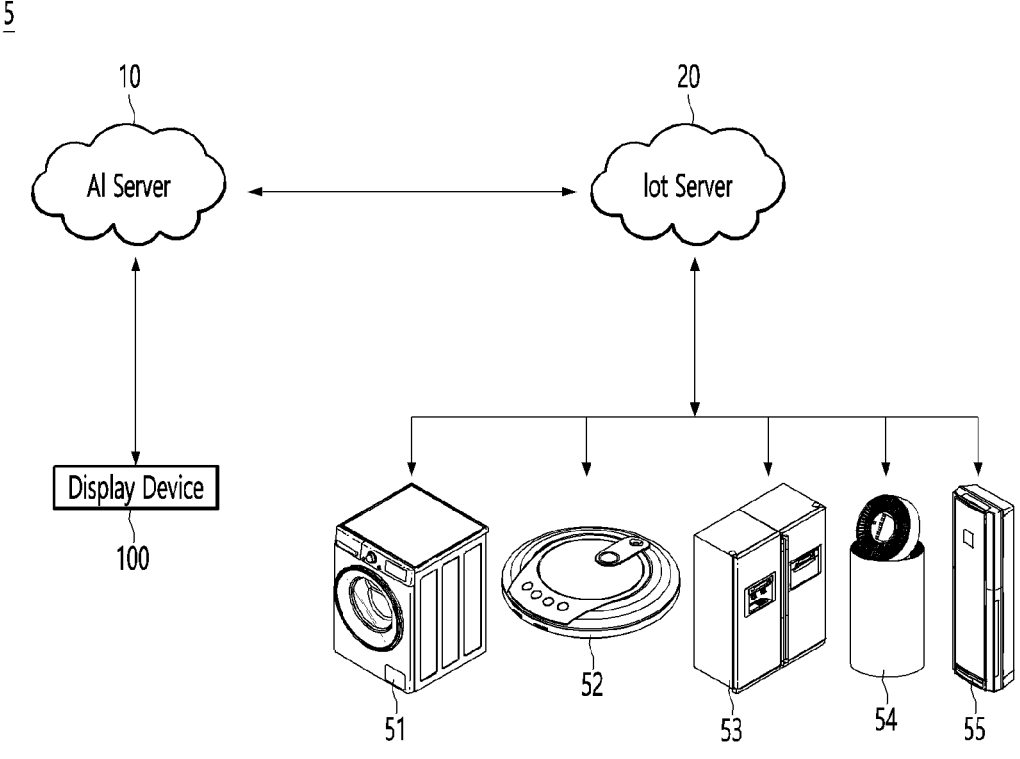
FIG. 5 is a view for describing an artificial intelligence (AI) system according to an embodiment of the present disclosure.

FIG. 5 is a view for describing an artificial intelligence (AI) system according to an embodiment of the present disclosure.

An AI system 5 may include a display device 100, an AI server 10, an IoT server 20, and a plurality of home appliances 51 to 55.

The display device 100 may wirelessly communicate with the AI server 10.

The display device 100 may transmit, to the AI server 10, voice data corresponding to a voice command uttered by a user.

The AI server 10 may acquire the intent of the voice command based on the voice data received from the display device 100.

The AI server 10 or the IoT server 20 may identify one or more home appliances associated with the acquired intent.

The AI server 10 may request status information of one or more identified home appliances through the IoT server 20.

The AI server 10 may receive state information of one or more home appliances from the IoT server 20.

The AI server 10 may acquire recommended operation information of one or more home appliances based on the acquired intent of the voice command and the received status information of one or more home appliances.

The AI server 10 may transmit, to the display device 100, the intent analysis information of the voice command, the state information of one or more home appliances, and the recommended operation information of one or more home appliances.

The display device 100 may output the received intent analysis information, the received state information of one or more home appliances, and the received recommended operation information of one or more home appliances.

The display device 100 may transmit a request for the recommended operation to the AI server 10.

The AI server 10 may transmit a control command to the IoT server 20 to perform an operation corresponding to the recommended operation information.

The IoT server 20 may transmit the control command to the corresponding home appliance.

The IoT server 20 may periodically transmit identification information and state information of one or more home appliances to the AI server 10. The home appliances may be one of a washing machine 51, a robot cleaner 52, a refrigerator 53, an air purifier 54, and an air conditioner 55.

Figure 6A:
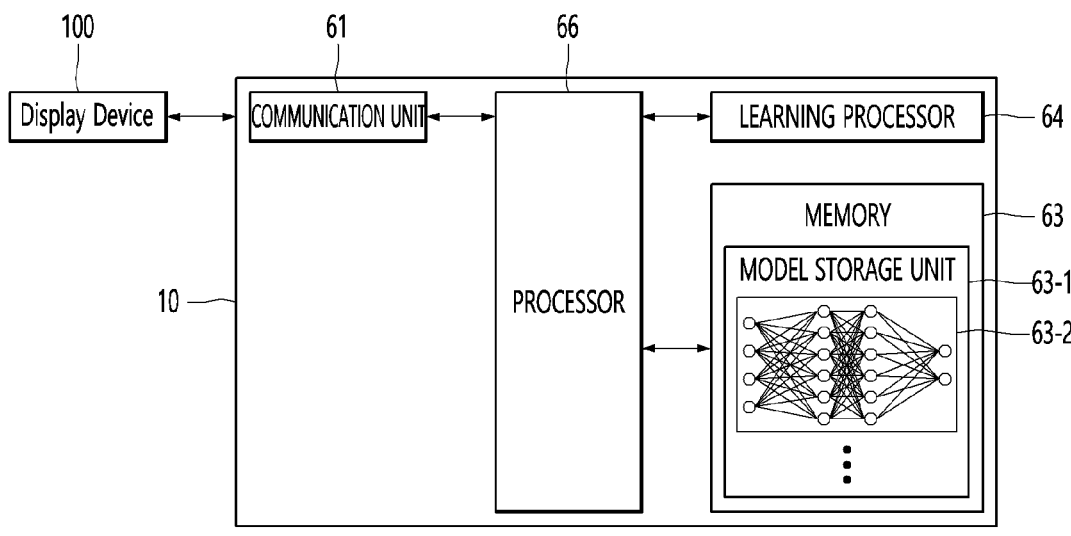
FIG. 6 is a block diagram for describing a configuration of an AI server according to an embodiment of the present disclosure.
Figure 6B:
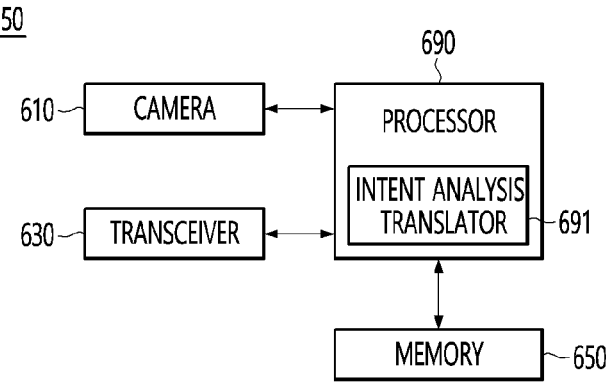

FIG. 6 is a block diagram for describing a configuration of an AI server according to an embodiment of the present disclosure.

Referring to FIG. 6, the AI server 10 may refer to a device that learns an artificial neural network by using a machine learning algorithm or uses a learned artificial neural network. The AI server 10 may be configured with a plurality of servers to perform distributed processing, and may be defined as a 5G network. In this case, the AI server 10 may be included as a part of the display device 100 to perform at least a part of AI processing together.

The AI server 10 may include a communication interface 61, a memory 63, a learning processor 64, and a processor 66.

The communication interface 61 may transmit or receive data to or from an external device such as the display device 100.

The memory 63 may include a model storage 63-1. The model storage 63-1 may store a model (or an artificial neural network 63-2) that is being learned or is learned through the learning processor 64.

The learning processor 64 may learn the artificial neural network 63-2 by using training data. The learning model may be used while being mounted on the AI server 10 of the artificial neural network, or may be used while being mounted on the external device such as the display device 100.

The learning model may be implemented as hardware, software, or a combination of hardware and software. When all or part of the learning model is implemented as software, one or more instructions constituting the learning model may be stored in the memory 63.

The processor 660 may infer a result value for new input data by using the learning model and generate a response or a control command based on the inferred result value.

The elements of FIG. 6 may also be included in the IoT server 20.

Figure 7:
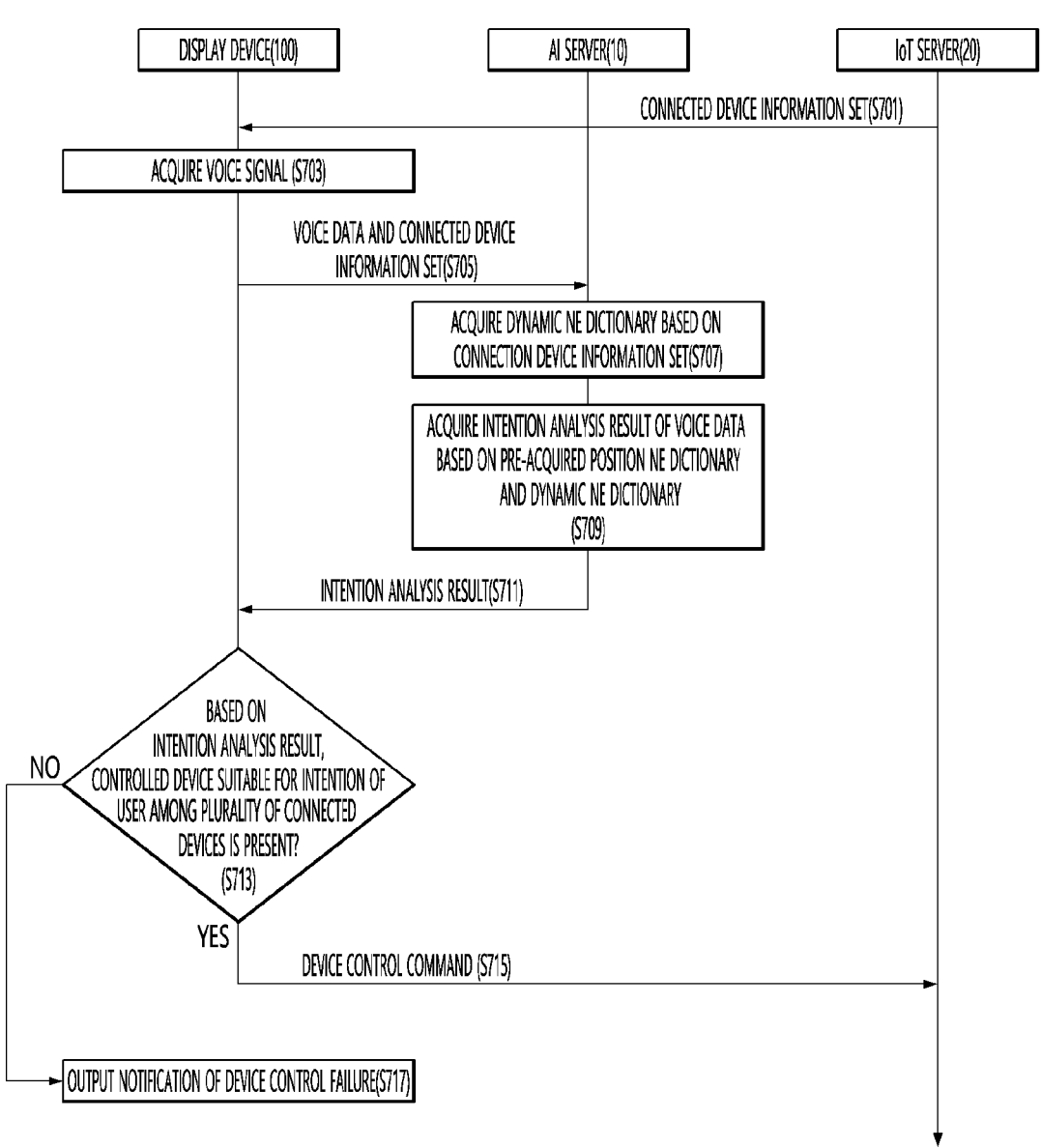
FIG. 7 is a ladder diagram for explaining a method of operating an artificial intelligence system according to an embodiment of the present disclosure.

FIG. 7 is a ladder diagram for explaining a method of operating an artificial intelligence system according to an embodiment of the present disclosure.

Hereinafter, the artificial intelligence system may be assumed to include the display device 100, the IoT server 20, and a home appliance 50, but is not limited thereto, and may further include the AI server 10.

The AI server 10 may be referred to as a natural language processing server.

The IoT server 20 may include the components of the AI server 10 of FIG. 6.

That is, the IoT server 20 may include the communication interface 61, the memory 63, the learning processor 64, and the processor 66.

The controller 170 of the display device 100 may receive a connection device information set from the IoT server 20 (S701).

The controller 170 of the display device 100 may receive the connection device information set from the IoT server 20 through the wireless communication interface 173.

The connection device information set may include information of each of a plurality of home appliances connected to each other through the display device 100 or the IoT server 20.

Information on a home appliance may include one or more of an alias (or name) of the home appliance, position information of the home appliance, a type of the home appliance, and operation information of the home appliance.

The alias of the home appliance may be a name preregistered by the user in order to identify the home appliance.

The operation information of the home appliance may include one or more of information on a power state of the home appliance, and information on a mode in which the home appliance operates.

Information on a home appliance will be described with reference to FIG. 8.

The display device 100 may receive the operation information of the home appliance from the IoT server 20.

Figure 8:
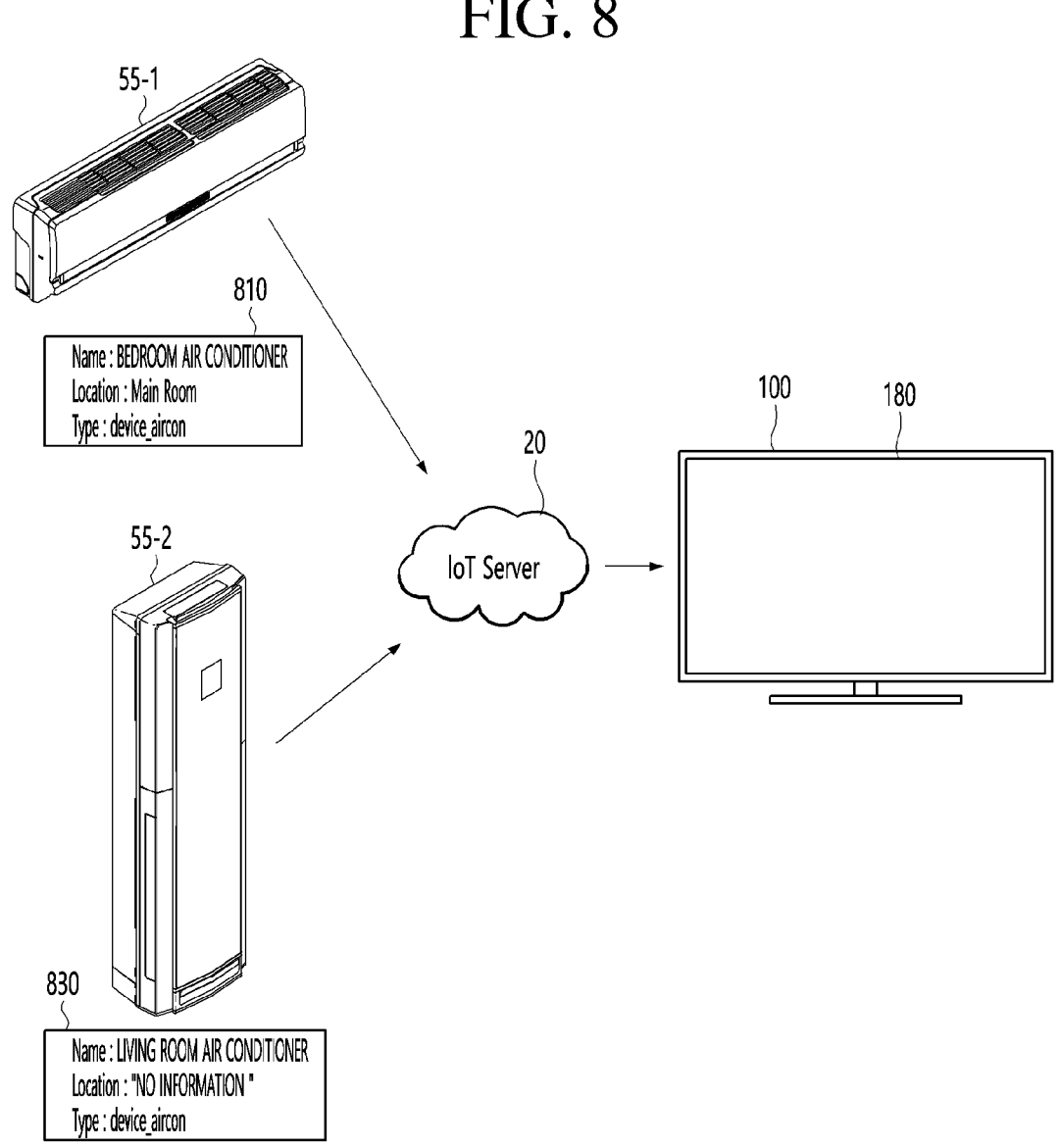
FIG. 8 is a diagram for explaining an example of information on a home appliance received from an IoT server by a display device according to an embodiment of the present disclosure.

FIG. 8 is a diagram for explaining an example of information on a home appliance received from an IoT server by a display device according to an embodiment of the present disclosure.

Referring to FIG. 8, it may be assumed that a first air conditioner 55-1 and a second air conditioner 55-2 are connected to the display device 100 through the IoT server 20 and the Internet in a house.

The IoT server 20 may collect device information from each of the first air conditioner 55-1 and the second air conditioner 55-2.

The display device 100 may receive the connection device information set from the IoT server 20.

The connection device information set may include first air conditioner information 810 and second air conditioner information 830.

The first air conditioner information 810 may include an alias (bedroom air conditioner), position information (main room), a type (aircon), and operation information (power state, and operating mode) of the first air conditioner 55-1. The alias of the first air conditioner 55-1 may refer a device name preset by the user for the first air conditioner 55-1.

The second air conditioner information 830 may include an alias (living room air conditioner), position information (no information), type (aircon), and operation information (power state, operating mode) of the second air conditioner 55-2.

The IoT server 20 may transmit a connection device information set including the first air conditioner information 810 and the second air conditioner information 830 to the display device 100.

The IoT server 20 may receive a request for a connection device information set from the display device 100, and transmit the connection device information set to the display device 100 in response to the received request.

In another example, the IoT server 20 may periodically transmit the connection device information set to the display device 100.

The display device 100 may store the received connection device information set in the storage 140.

FIG. 7 is described again.

Then, the controller 170 of the display device 100 may acquire a voice signal corresponding to a voice command uttered by the user (S703).

According to an embodiment, the controller 170 may receive a voice signal corresponding to a voice command through a microphone included in the user interface 150.

According to another embodiment, the controller 170 may receive a voice signal corresponding to the voice command received by the remote control device 200 from the remote control device 200.

The controller 170 of the display device 100 may transmit the voice data corresponding to the voice command and the connection device information set to the AI server 10 (S705).

The controller 170 may transmit the voice data corresponding to the voice command uttered by the user and the connection device information set to the AI server 10 through the network interface 133.

The processor 66 of the AI server 10 may acquire a dynamic name entity (NE) dictionary based on the connection device information set received from the display device 100 (S707).

The dynamic NE dictionary may be generated using information of each home appliance included in the connection device information set.

The dynamic NE dictionary may be configured differently according to the connection device information set, and thus may be dynamically changed.

The processor 66 may extract the alias and position of each home appliance from information on each home appliance included in the connection device information set.

The processor 66 may register each extracted alias and position of the home appliance in the dynamic NE dictionary.

FIG. 9 is a diagram for explaining an example of a dynamic NE dictionary generated based on a connection device information set according to an embodiment of the present disclosure.

For example, the processor 66 may extract "bedroom air conditioner", the alias of the first air conditioner 55-1 and "Main Room", a position of the first air conditioner 55-1 from the first air conditioner information 810 of FIG. 8.

The processor 66 may add the extracted "bedroom air conditioner" and "Main Room" to a dynamic NE dictionary 900.

Similarly, the processor 66 may extract "living room air conditioner," an alias of the second air conditioner 55-2, from the second air conditioner information 830 in FIG. 9, and add the extracted "living room air conditioner" to the dynamic NE dictionary 900. Since the second air conditioner information 830 does not include the position of the second air conditioner 55-2, the position of the second air conditioner 55-2 may not be added to the dynamic NE dictionary 900.

As such, the processor 66 may generate the dynamic NE dictionary 900 using the connection device information set received from the display device 100. The processor 66 may store the generated dynamic NE dictionary 900 in the memory 63.

The dynamic NE dictionary 900 may be used to analyze intention of a voice command uttered by the user.

FIG. 7 is described again.

The processor 66 of the AI server 10 may acquire an intention analysis result of the voice command uttered by the user based on text data of voice data, a pre-acquired position NE dictionary, and a dynamic NE dictionary (S709).

According to an embodiment, a pre-acquired position NE dictionary may be pre-stored in the memory 63 of the AI server 10.

The position NE dictionary may include words indicating a position.

FIG. 10 is a diagram for explaining an example of a position NE dictionary according to an embodiment of the present disclosure.

FIG. 10 shows an example of a position NE dictionary 1000.

The position NE dictionary 1000 may include words indicating the position at which a home appliance is positioned.

For example, the position NE dictionary 1000 may include words indicating the position in which a home appliance is positioned, such as "bedroom", "living room", "kitchen", and "library".

The position NE dictionary 1000 may be used in intention analysis of a voice command uttered by the user.

FIG. 7 is described again.

The processor 66 may convert voice data into text data using a speech to text (STT) engine.

The processor 66 may perform intention analysis of a voice command uttered by the user through comparison between the converted text data and the position NE dictionary and comparison between the text data and the dynamic NE dictionary.

FIG. 11 is a flowchart for explaining a procedure of acquiring an intention analysis result by an AI server according to an embodiment of the present disclosure. FIG. 12 is a diagram showing an example of various types of intention analysis results.

The processor 66 of the AI server 10 may analyze intention of the text data corresponding to the voice command uttered by the user using a natural language processing engine (S1101).

The natural language processing engine may be a program for performing intention analysis for the text data.

The processor 66 may determine the intention of the text data using a natural language processing engine.

The natural language processing engine may generate intention analysis information by sequentially performing a morpheme analysis stage, a syntax analysis stage, a dialogue act analysis stage, and a dialogue processing stage on the text data.

The morpheme analysis stage is a stage in which text data corresponding to voice uttered by a user is classified into morpheme units, which are the smallest units having meaning, and what parts of speech each classified morpheme has is determined.

The syntax analysis stage is a stage in which text data is classified into noun phrases, verb phrases, and adjective phrases using the results of the morpheme analysis stage, and what kind of relationship exists between the classified phrases is determined.

Through the syntax analysis stage, a subject, an object, and modifiers of the voice uttered by the user may be determined.

The dialogue act analysis stage is a stage in which intention of the voice uttered by the user is analyzed using the result of the syntax analysis stage. In detail, the dialogue act analysis stage is a stage in which intention of a sentence is determined, such as whether the user asks a question, makes a request, or simply expresses emotion.

The dialogue processing stage is a stage in which whether to answer, respond to user utterance, or ask questions for additional information using the results of the dialogue act analysis stage.

After the dialogue processing stage, the natural language processing engine may generate intention analysis information including one or more of an answer, a response, and an inquiry for additional information about the intention uttered by the user.

The natural language processing engine may acquire a type of home appliance and operation information of the home appliance from text data.

The natural language processing engine may extract a plurality of words from text data.

In particular, the natural language processing engine may extract a plurality of words or combinations of the words in which parts of speech are nouns.

For example, when a command uttered by the user is <Turn on living room lighting>, the extracted word may be <living room>, <lighting>, <living room lighting>, and <Turn on>.

The processor 66 may acquire a type of home appliance as a lighting device through the word <lighting>. The processor 66 may acquire operation information for powering on a home appliance through the word <Turn on>.

The processor 66 of the AI server 10 may determine whether a word included in text data acquired according to intention analysis of text data is present in a position NE dictionary (S1103).

The processor 66 may compare a word included in text data with a plurality of words indicating a position included in the position NE dictionary. The processor 66 may determine whether the word included in the text data in the position NE dictionary according to the comparison result.

When the word included in the text data is present in the position NE dictionary, the processor 66 of the AI server 10 may acquire the intention analysis result using the word as position information of the home appliance (S1105).

When the word included in the text data is present in the position NE dictionary, the processor 66 may acquire the corresponding word as the position of the home appliance.

For example, when the command uttered by the user is <Turn on living room lighting>, the extracted words may be <living room>, <lighting>, and <living room lighting>.

Since the word <living room> is present in the position NE dictionary 1000 shown in FIG. 10, the processor 66 may acquire <living room> as position information of the home appliance.

As shown in FIG. 12, the processor 66 may acquire a first intention analysis result 1210 including a type (lighting) of a home appliance, a position (bedroom) of the home appliance, and operation information (power on) of the home appliance.

The processor 66 may transmit the acquired intention analysis result to the display device 100.

Since the word included in the text data is not present in the position NE dictionary, the processor 66 of the AI server 10 may determine whether the corresponding word is present in the dynamic NE dictionary (S1107).

For example, it is assumed that the command uttered by the user is <Turn on my lighting>.

In this case, the extracted word or combinations of words may be <my>, <lighting>, <my lighting>, <Turn on>, and the like.

The processor 66 may compare the extracted word with the position NE dictionary 1000 to determine that the extracted word is not present in the position NE dictionary 1000.

When the word included in the text data is present in the dynamic NE dictionary, the processor 66 of the AI server 10 may acquire the intention analysis result using the corresponding word as an alias of the home appliance (S1109).

When the same name entity as <my lighting> is present in the dynamic NE dictionary 900, the processor 66 may acquire the corresponding name entity as an alias (or name) of a home appliance.

The processor 66 may acquire a second intention analysis result 1230 including a type (lighting device) of a home appliance, an alias (my lighting) of the home appliance, and operation information (power on) of the home appliance from <Turn on my lighting> uttered by the user.

The processor 66 may transmit the acquired second intention analysis result 1230 to the display device 100.

When the word is not present in a dynamic dictionary, the processor 66 of the AI server 10 may acquire an intention analysis result including the type and operation information of the home appliance according to intention analysis of text data (S1111).

When the words or combinations of the words extracted from the text data are not present in both the position NE dictionary 1000 and the dynamic NE dictionary 900, the processor 66 may acquire a third intention analysis result 1250 including a type and operation information of the home appliance.

The processor 66 may transmit the acquired third intention analysis result 1250 to the display device 100.

FIG. 7 is described again.

The processor 66 of the AI server 10 may transmit the acquired intention analysis result to the display device 100 through the communication interface 61 (S711).

The controller 170 of the display device 100 may determine whether a controlled device corresponding to user intention is present among a plurality of connected home appliances based on the intention analysis result received from the AI server 10 (S713).

The controller 170 may compare the connection device information set including information of each of the plurality of home appliances connected to the display device 100 with the intention analysis result to determine whether there is a controlled device corresponding to user intention.

For example, when the intention analysis result is the first intention analysis result 1210 shown in FIG. 12, if the connection device information set includes information on a device corresponding to the type (lighting) and position information (living room) of the home appliance included in the first intention analysis result 1210, the controller 170 may determine the corresponding home appliance as the controlled device.

That is, the controller 170 may determine the controlled device corresponding to intention of the voice command uttered by the user as a lighting positioned in a living room.

When there is a controlled device corresponding to intention of the user among the plurality of connected home appliances, the controller 170 of the display device 100 may transmit a control command for controlling the controlled device to the IoT server 20 (S715).

The controller 170 may transmit a control command including identification information of the controlled device and operation information of the controlled device to the IoT server 20.

The identification information of the controlled device may be information for identifying the controlled device and may include a model and identification ID of the controlled device.

When there is no controlled device corresponding to user intention among the plurality of connected home appliances, the controller 170 of the display device 100 may output notification of device control failure (S717).

When the connection device information set does not include information on a device corresponding to a type (lighting) and position information (living room) of the home appliance included in the first intention analysis result 1210 or the connection device information set does not include information on a device corresponding to a type (lighting) and alias (my lighting) of the home appliance included in the second intention analysis result 1230, the controller 170 may output notification of device control failure.

The controller 170 may display notification of device control failure through the display 180 or may output notification of device control failure through the audio output interface 185.

FIG. 13 is a diagram for explaining a procedure of controlling any one home appliance through a voice command of a user when homogeneous home appliances are connected to a display device according to an embodiment of the present disclosure.

In FIG. 13, it may be assumed that the first air conditioner 55-1 positioned in a bedroom and the second air conditioner 55-2 positioned in a living room are connected to the display device 100.

Referring to FIG. 13, the user may utter a voice command <Turn on bedroom air conditioner>. The remote control device 200 may receive the voice command and transmit a voice signal corresponding to the received voice command to the display device 100.

The display device 100 may receive a connection device information set from the IoT server 20.

The display device 100 may transmit the connection device information set and voice data corresponding to the voice signal received from the remote control device 200, to the AI server 10.

The AI server 10 may acquire the intention analysis result for the voice command of the user based on the connection device information set and voice data received from the display device 100.

The AI server 10 may convert voice data into text data, and acquire an intention analysis result of the voice data based on the converted text data, the dynamic NE dictionary 900 shown in FIG. 9, and the position NE dictionary 1000 shown in FIG. 10.

The procedure of acquiring the intention analysis result may be replaced with the embodiments of FIGS. 11 and 12.

The display device 100 may receive the intention analysis result from the AI server 10 and compare the received intention analysis result with the connection device information set.

When there is a device corresponding to the intention analysis result among a plurality of home appliances included in the connection device information set, the display device 100 may determine the corresponding device as the controlled device.

For example, the display device 100 may determine an air conditioner positioned in a bedroom as the controlled device.

The display device 100 may transmit a control command for controlling the determined controlled device to the IoT server 20 based on the intention analysis result.

The control command may include identification information and operation information of the controlled device.

The IoT server 20 may transmit a power-on command to the bedroom air conditioner 55-1 according to the control command received from the display device 100 and power on the bedroom air conditioner 55-1 according to the power-on command.

As such, according to an embodiment of the present disclosure, the user may easily control a desired home appliance by simply speaking even if two or more homogeneous home appliances are connected to the display device 100.

FIG. 14 is a diagram for explaining an example of outputting notification of device control failure when there is no home appliance corresponding to intention of a voice command of a user according to an embodiment of the present disclosure.

Referring to FIG. 14, the display device 100 may compare the intention analysis result from the AI server 10 with the connection device information set received from the IoT server 20, and display notification 1400 of failure of recognition of the controlled device when there is no matched device in the connection device information set.

Figure 15:
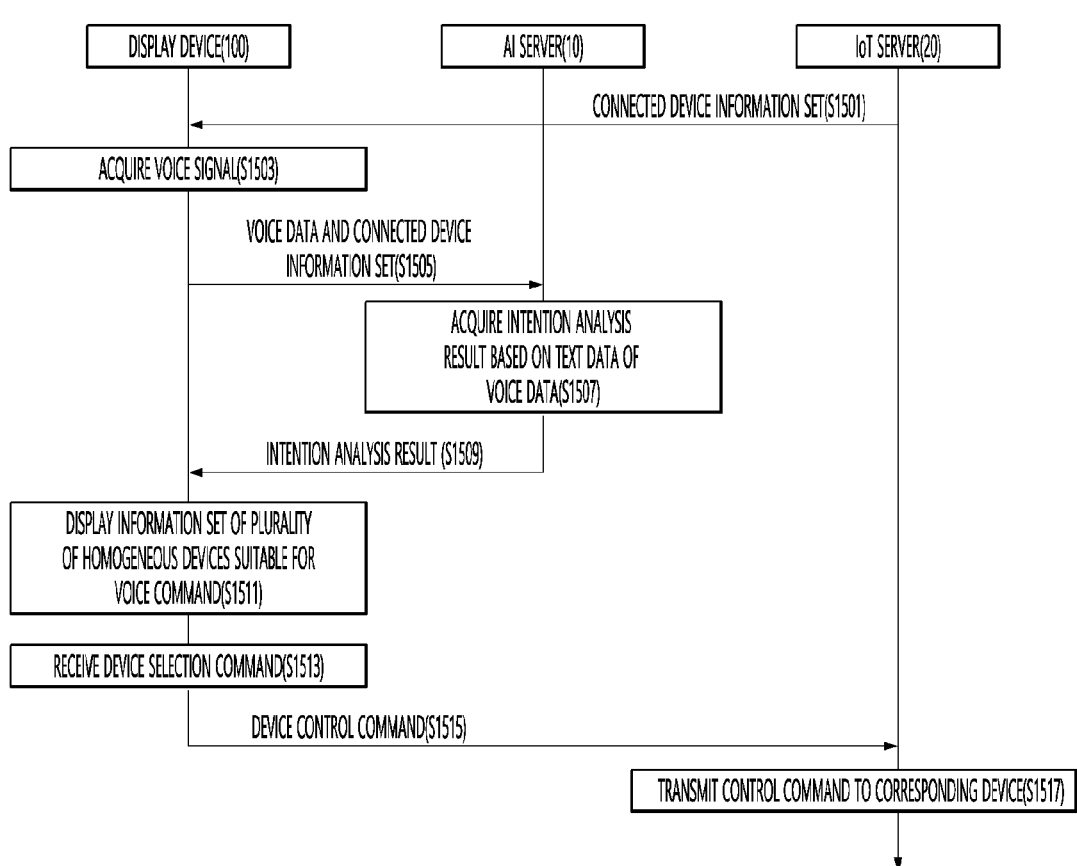
FIG. 15 is a ladder diagram for explaining a method of operating an artificial intelligence system according to another embodiment of the present disclosure.

FIG. 15 is a ladder diagram for explaining a method of operating an artificial intelligence system according to another embodiment of the present disclosure.

In FIG. 15, repeated descriptions of FIG. 7 will not be given.

The controller 170 of the display device 100 may receive the connection device information set from the IoT server 20 (S1501).

Then, the controller 170 of the display device 100 may acquire a voice signal corresponding to the voice command uttered by the user (S1503).

The controller 170 of the display device 100 may transmit the voice data corresponding to the voice signal and the connection device information set to the AI server 10 (S1505).

The processor 66 of the AI server 10 may acquire an intention analysis result of the voice command based on the text data of the voice data (S1507).

The processor 66 may convert the voice data into text data using the STT engine. The processor 66 may acquire the intention analysis result from the text data using the natural language processing engine.

The intention analysis result may include a type of a home appliance of a controlled device and operation information of the home appliance.

The processor 66 may determine whether there are a plurality of homogeneous controlled devices according to intention analysis of the text data. The processor 66 may determine whether there are a plurality of homogeneous controlled devices based on each type of a plurality of home appliances included in the connection device information set.

When determining that there are a plurality of homogeneous controlled devices, the processor 66 may insert information indicating that the controlled device includes homogeneous home appliances into the intention analysis result That is, the intention analysis result may include information indicating that the controlled device includes homogeneous home appliances.

The processor 66 of the AI server 10 may transmit the intention analysis result to the display device 100 through the acquired communication interface 61 (S1509).

The controller 170 of the display device 100 may display a plurality of device items corresponding to the plurality of respective homogeneous devices corresponding to intention of the voice command based on the received intention analysis result, on the display 180 (S1511).

The controller 170 may display a plurality of device items on the display 180 in order to induce selection of one of the plurality of homogeneous devices.

The controller 170 of the display device 100 may receive a device selection command for selecting any one of the plurality of device items (S1513) and transmit a device control command for controlling a corresponding device to the IoT server 20 according to the received device selection command (S1515).

The device control command may include identification information of the controlled device and operation information of the controlled device.

The identification information of the controlled device may include an ID for identifying the controlled device.

The operation information of the controlled device may include information indicating a power operation and a function operation of the controlled device.

The IoT server 20 may transmit the control command to the corresponding device according to the device control command received from the display device 100 (S1517).

The home appliance that receives the control command may perform an operation according to the operation information included in the control command.

Operations S1511 to S1515 will be described with reference to the following diagrams.

Figure 16:
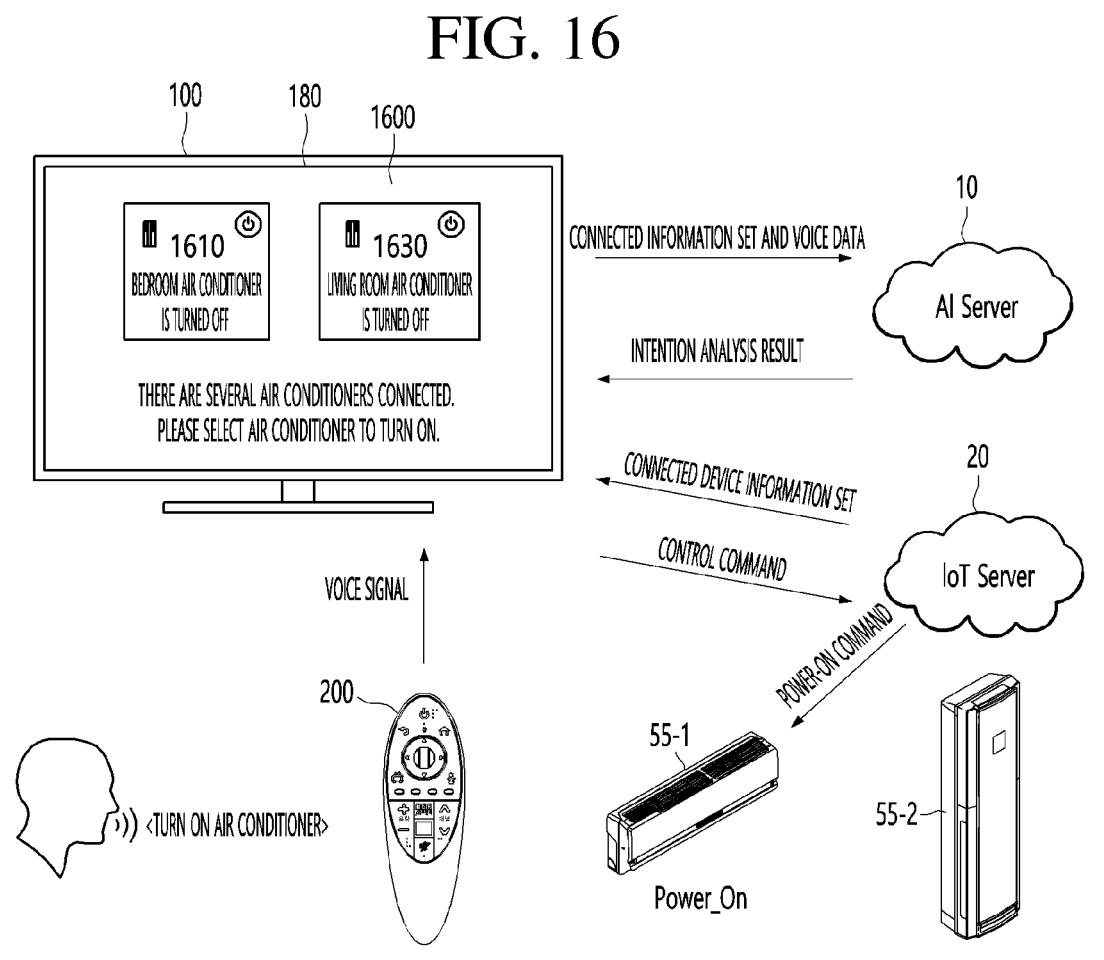

FIG. 16 is a diagram for explaining a processing method when there is a plurality of controlled devices according to a voice command uttered by a user according to an embodiment of the present disclosure.

In FIG. 16, it may be assumed that the user says <Turn on the air conditioner> and that a home appliance connected to the display device 100 is the first air conditioner 55-1 and the second air conditioner 55-2.

The remote control device 200 may receive a voice command of the user and transmit a voice signal corresponding to the received voice command to the display device 100.

The display device 100 may also directly receive the voice command of the user without the remote control device 200.

The display device 100 may transmit voice data corresponding to the received voice signal and the connection device information set received from the IoT server 20 to the AI server 10.

The AI server 10 may convert the voice data into text data and acquire the intention analysis result based on the converted text data and the connection device information set.

The intention analysis result may include a type of a home appliance to be controlled and operation information of the home appliance.

The processor 66 of the AI server 10 may determine whether there is a plurality of homogeneous controlled devices based on the intention analysis result and the connection device information set.

When intention of the user is determined to control a power operation of a home appliance as an air conditioner according to intention analysis of the voice command of the user, the processor 66 of the AI server 10 may determine that there is a plurality of air conditioners based on the connection device information set.

When there is a plurality of air conditioners, the processor 66 of the AI server 10 may insert information indicating that there are homogeneous air conditioners into the intention analysis result and transmit the information to the display device 100.

As shown in FIG. 16, the display device 100 may display a homogeneous device list 1600 on the display 180 based on the intention analysis result received from the AI server 10.

When there is a plurality of controlled devices corresponding to utterance intention of the user, the homogeneous device list 1600 may be a list displayed for selection of the controlled device.

The homogeneous device list 1600 may include a first air conditioner item 1610 for power control of an air conditioner positioned in a bedroom and a second air conditioner item 1630 for power control of an air conditioner positioned in a living room.

The homogeneous device list 1600 may further include a guide text indicating that there are a plurality of air conditioners connected to the display device 100 and instructing a user to select an air conditioner with power to be controlled among the plurality of air conditioners.

When receiving a command for selecting the first air conditioner item 1610, the display device 100 may transmit a control command for controlling power of the first air conditioner 55-1 corresponding to the first air conditioner item 1610 to the IoT server 20.

According to an embodiment, the display device 100 may receive a selection command from the remote control device 200 or receive a selection command through a voice command of the user.

The IoT server 20 may transmit a power-on command to the first air conditioner 55-1 according to the control command received from the display device 100. The first air conditioner 55-1 may be powered on according to the power-on command.

As such, according to an embodiment of the present disclosure, even if homogeneous home appliances are connected to the display device 100, the user may conveniently control a desired home appliance.

According to another embodiment of the present disclosure, when a plurality of controlled devices are connected to the display device 100, only valid devices for the voice command of the user may be displayed.

Figure 17:
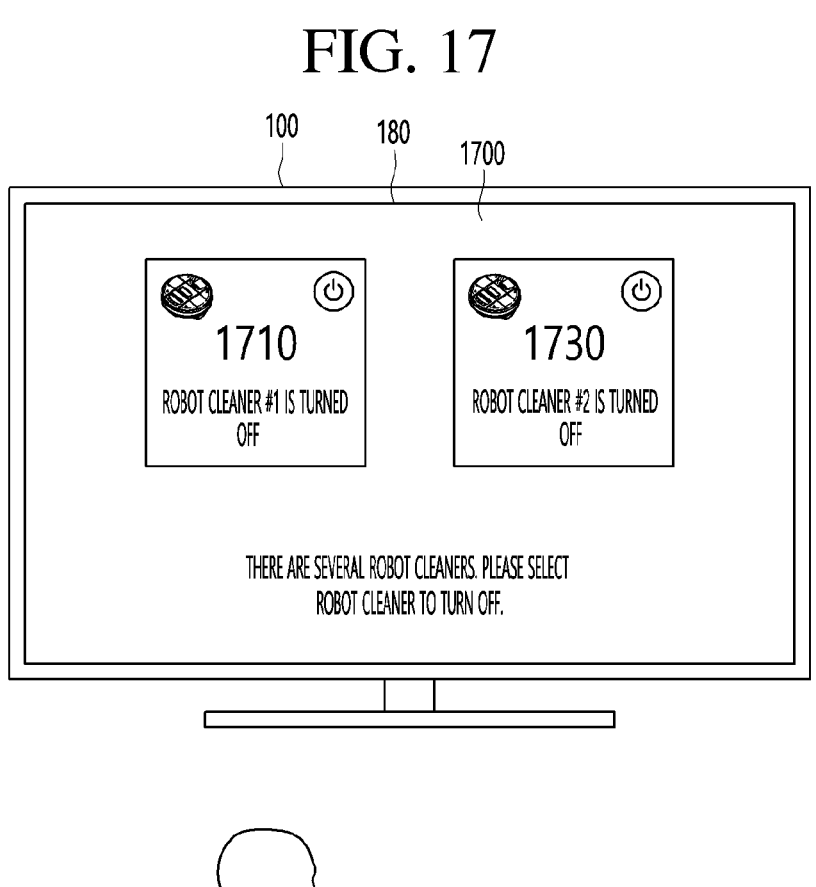
FIG. 17 is a diagram for explaining an example in which only a device corresponding to operation intention of a voice command uttered by a user is exposed among a plurality of homogeneous devices when there is a plurality of controlled devices based on the voice command according to an embodiment of the present disclosure.

FIG. 17 is a diagram for explaining an example in which only a device corresponding to operation intention of a voice command uttered by a user is exposed among a plurality of homogeneous devices when there is a plurality of controlled devices based on the voice command according to an embodiment of the present disclosure.

In FIG. 17, it is assumed that three robot cleaners are connected to the display device 100 through the IoT server 20 and the user says a voice command of <Turn off robot cleaner>.

It may be assumed that two of three robot cleaners are powered on and one robot cleaner is powered off.

The display device 100 may transmit voice data corresponding to the voice command and the connection device information set to the AI server 10.

The connection device information set may include information on three robot cleaners connected to the display device 100. Each of each robot cleaner may include a type (cleaner) of a robot cleaner, position information of the robot cleaner, a name of the robot cleaner, and operation state information of the robot cleaner.

The operation state information of the robot cleaner may include information on the power state of the robot cleaner and a cleaning mode of the robot cleaner.

The AI server 10 may determine <Power off of robot cleaner> as intention of the user based on the voice data and the connection device information set.

The AI server 10 may extract only a powered-on robot cleaner on among three robot cleaners based on the connection device information set.

The AI server 10 may add the identification information of the powered-on robot cleaner to the intention analysis result and transmit the information to the display device 100.

As shown in FIG. 17, the display device 100 may display a homogeneous device list 1700 including powered-on robot cleaners on the display 180 based on the intention analysis result received from the AI server 10.

The homogeneous device list 1700 may include a first robot cleaner item 1710 indicating a powered-on first robot cleaner and a second robot cleaner item 1730 indicating a powered-on second robot cleaner.

The homogeneous device list 1700 may further include a guide text indicating that there are a plurality of robot cleaners connected to the display device 100 and instructing a user to select a robot cleaner to be powered off among the plurality of robot cleaners.

When receiving a command to select the first robot cleaner item 1710, the display device 100 may transmit a control command for controlling power of the first robot cleaner corresponding to the first robot cleaner item 1710 to the IoT server 20.

According to an embodiment, the display device 100 may receive a selection command from the remote control device 200 or may receive a selection command through a voice command of the user.

The IoT server 20 may transmit a power off command to the first robot cleaner item 1710 according to the control command received from the display device 100. The first robot cleaner may be powered off according to a power off command.

As such, according to an embodiment of the present disclosure, even when several homogeneous home appliances are connected to the display device 100, a homogeneous device list to which utterance intention and operating state information of the home appliances are applied may be displayed.

The user may easily select the controlled device through the homogeneous device list.

FIG. 18 is a diagram for explaining an example in which only a device suitable for operation intention of a voice command among a plurality of homogeneous devices when there are a plurality of controlled devices based on a voice command uttered by a user according to another embodiment of the present disclosure.

In FIG. 18, it may be assumed that three air purifiers are connected to the display device 100 through the IoT server 20, and the user utters a voice command <Air purifier, tell me level of fine dust>.

It may be assumed that two of three air purifiers are powered on and is capable of providing fine dust levels, and one air purifier is powered on but is not capable of providing fine dust levels.

The display device 100 may transmit the voice data and connection device information set corresponding to the voice command to the AI server 10.

The connection device information set may include information on three air purifiers connected to the display device 100. Information on each air purifier may include a type (air purifier) of an air purifier, position information of the air purifier, a name of the air purifier, and operation state information of the air purifier.

The operation state information of the air purifier may include a power state of the air purifier and whether to measure fine dust.

The AI server 10 may determine <Provide fine dust level of air purifier> as intention of the user based on the voice data and the connection device information set.

The AI server 10 may extract only an air purifier that is powered on and is capable of providing a fine dust level among three air purifiers based on the connection device information set.

The AI server 10 may add identification information of an air purifier that is powered on to the intention analysis result and may transmit the information to the display device 100.

The display device 100 may display a homogeneous device list 1800 including information on the powered-on air purifier on the display 180 based on the intention analysis result received from the AI server 10, as shown in FIG. 18.

The homogeneous device list 1800 may include a first air purifier item 1810 indicating a first air purifier that is powered on and is capable of providing a fine dust level, and a second air purifier item 1830 indicating a second air purifier that is powered on and is capable of providing a fine dust level.

The homogeneous device list 1800 may further include a guide text indicating that there are a plurality of air purifiers connected to the display device 100 and instructing a user to select an air purifier for providing a fine dust level among the plurality of air purifiers.

When receiving a command for selecting the first air purifier item 1810, the display device 100 may transmit a control command requesting to provide a fine dust level to the first air purifier corresponding to the first air purifier item 1810 to the IoT server 20.

According to an embodiment, the display device 100 may receive a selection command from the remote control device 200 or may receive the selection command through the voice command of the user.

The IoT server 20 may transmit a command to provide a fine dust level to the first air purifier 1810 according to the control command received from the display device 100. The first air purifier may transmit the fine dust level according to the command to provide the fine dust level to the IoT server 20.

The IoT server 20 may transmit the received fine dust level to the display device 100 and the display device 100 may display the received fine dust level.

As such, according to an embodiment of the present disclosure, even if several homogeneous home appliances are connected to the display device 100, the homogeneous device list to which utterance intention and operation state information of a home appliance are applied may be displayed.

The user may easily select the controlled device through the homogeneous device list.

FIG. 19 is a diagram for explaining an example in which only a device corresponding to operation intention of a voice command among a plurality of homogeneous devices is exposed when there are a plurality of controlled device based on a voice command uttered by a user according to another embodiment of the present disclosure.

In FIG. 19, it may be assumed that two air purifiers are connected to the display device 100 through the IoT server 20 and the user utters a voice command <Turn on air purifier>.

The display device 100 may transmit the voice data and connection device information set corresponding to the voice command to the AI server 10.

The AI server 10 may reinterpret the intention of the user based on the voice data and the connection device information set.

For example, the AI server 10 may reinterpret user intention to power on the air purifier as adjusting the strength of the air purifier when both air purifiers are powered on based on the connection device information set.

That is, since two air purifiers are already turned on, the AI server 10 may determine user intention as increasing the strength of the air purifier.

The AI server 10 may add identification information and operation information of two air purifiers to the intention analysis result and may transmit the information to the display device 100, and the display device 100 may display a homogeneous device list 1900 on the display 180 based on the intention analysis result.

The homogeneous device list 1900 may include a first air purifier item 1910 that is powered on and has strength <medium> and a second air purifier item 1930 that is powered on and has strength <weak>.

The homogeneous device list 1800 may further include a guide text indicating that there are a plurality of air purifiers connected to the display device 100 and instructing a user to select an air purifier for providing a fine dust level among the plurality of air purifiers.

When receiving a command to select the first air purifier item 1910, the display device 100 may transmit a control command to increase the strength of a first air purifier corresponding to the first air purifier item 1910 to the IoT server 20.

According to an embodiment, the display device 100 may receive a selection command from the remote control device 200 or may receive the selection command through a voiced command of the user.

The IoT server 200 may transmit a strength increase command to the first air purifier 1910 according to the control command received from the display device 100. The first air purifier may increase the strength of the air purifier according to the strength increase command.

Figure 20:
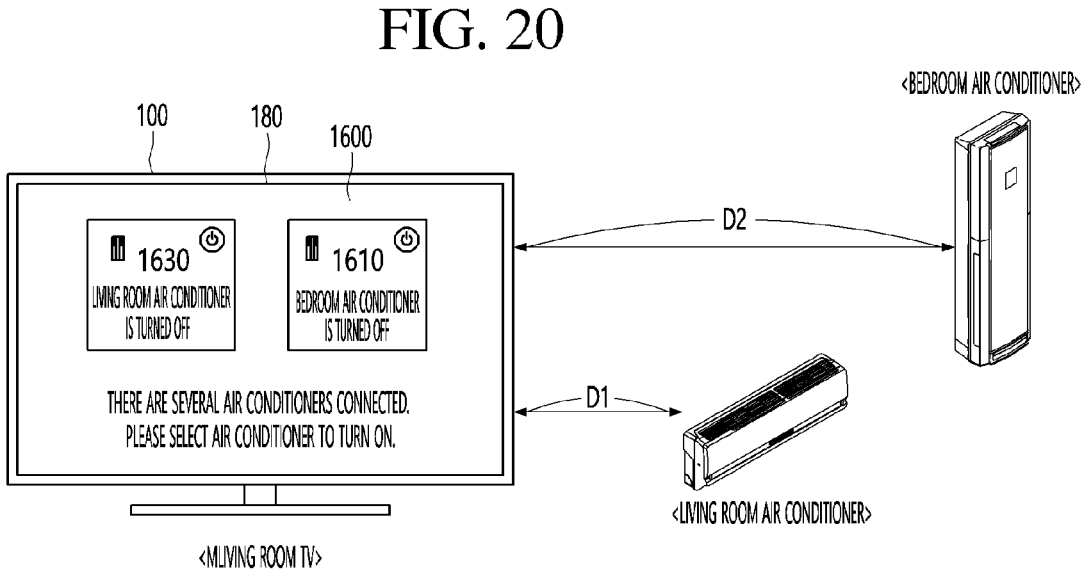
FIG. 20 is a diagram for explaining an example of changing an exposure order of home appliance items based on a distance from a display device among homogeneous home appliances suitable for utterance intention of a user according to an embodiment of the present disclosure.

FIG. 20 is a diagram for explaining an example of changing an exposure order of home appliance items based on a distance from a display device among homogeneous home appliances suitable for utterance intention of a user according to an embodiment of the present disclosure.

The embodiment of FIG. 20 is the same as the embodiment of FIG. 16 except that an order of device items included in the homogeneous device list 1600 varies depending on a distance between the display device 100 and the home appliance.

In FIG. 20, it may be assumed that a first distance D1 between the display device 100 positioned in a living room and the first air conditioner 55-1 positioned in the living room is shorter than a second distance D2 between the display device 100 and the second air conditioner 55-2 positioned in a bedroom.

The controller 170 of the display device 100 may measure a distance between the first air conditioner 55-1 and the second air conditioner 55-2 using Received Signal Strength Indication (RSSI).

Since the first distance is shorter than the second distance, the display device 100 may recognize intention as controlling the first air conditioner 55-1 and may display the second air conditioner item 1630 corresponding to the first air conditioner 55-1 before the first air conditioner item 1610 corresponding to the second air conditioner 55-2.

Accordingly, the user may select an air conditioner to be more easily controlled, thereby improving convenience.

Figure 21:
FIG. 21 is a diagram for explaining an example of changing an exposure order of home appliance items based on a circumstance when there are multiple controlled devices based on a voice command uttered by a user according to another embodiment of the present disclosure.

FIG. 21 is a diagram for explaining an example of changing an exposure order of home appliance items based on a circumstance when there are multiple controlled devices based on a voice command uttered by a user according to another embodiment of the present disclosure.

In FIG. 21, it may be assumed that two air purifiers are connected to the display device 100 through the IoT server 20 and a user utters a voice command <Turn on the air purifier strongly>.

The display device 100 may transmit the voice data and connection device information set corresponding to the voice command to the AI server 10.

The connection device information set may include information on three air purifiers connected to the display device 100. Information on each air purifier may include a type (air purifier) of an air purifier, position information of the air purifier, a name of the air purifier, and operation state information of the air purifier.

The operation state information of the air purifier may include a power state of the air purifier and a fine dust level measured by the air purifier.

The AI server 10 may determine <Increase strength of air purifier> as intention of the user based on the voice data and connection device information set.

The AI server 10 may add identification information of a powered-off air purifier to the intention analysis result and may transmit the information to the display device 100.

As shown in FIG. 20, based on the intention analysis result received from the AI server 10, the display device 100 may display a homogeneous device list 2100 including information on the powered-off air purifier on the display 180.

The homogeneous device list 2100 may include a first air purifier item 2110 corresponding to a first air purifier with a fine dust level measured as 92 and a second air purifier item 2130 corresponding to a second air purifier with a fine dust level measured as 17.

The display device 100 may display the first air purifier item 2110 corresponding to a first air purifier with a worse fine dust level before the second air purifier item 2130.

That is, the display device 100 may determine that the voice command of the user is intention to quickly reduce a fine dust level, and may first expose an air purifier item positioned in a situation in which the fine dust level is worse.

As such, in consideration of a fine dust environment, as an air purifier to be controlled is exposed, the user may easily select the controlled device.

According to an embodiment of the present disclosure, the above-described method may be implemented with codes readable by a processor on a medium in which a program is recorded. Examples of the medium readable by the processor include a ROM, a RAM, a CD-ROM, a magnetic tape, a floppy disk, an optical data storage device, and the like.

The display device described above is not limitedly applicable to the configuration and method of the above-described embodiments, and the embodiments are configured by selectively combining all or part of each of the embodiments such that various modifications may be made.

The invention claimed is:

1. A display device comprising:

a display;

a communication interface connected to a first server and a second server, the first server collecting information on each of a plurality of home appliances and the second server acquiring an intention analysis result of a voice command uttered by a user; and a processor configured to obtain a connection device information set including information on each of a plurality of home appliances from the first server, acquire a voice signal corresponding to the voice command uttered by the user, transmit voice data corresponding to the voice signal and the connection device information set to the second server, receive the intention analysis result of the voice command from the second server, determine a home appliance corresponding to intention of the voice command among home appliances having the same function based on the received intention analysis result, and transmit a control command for controlling the determined home appliance to the first server, wherein for determining the home appliance, the processor is configured to display a homogeneous device list including homogeneous home appliance items based on the intention analysis result including information indicating that there are a plurality of homogeneous home appliances having the same function received from the second server, and wherein a display order of the homogeneous home appliance items in the homogeneous device list is determined based on surrounding environmental conditions in which each of the homogeneous home appliances is located.

2. The display device of claim 1, wherein the connection device information set includes one or more of an alias of each home appliance, position information of each home appliance, and a type of each home appliance, and wherein the alias of each home appliance is a name pre-registered by the user for each home appliance.

3. The display device of claim 2, wherein the processor compares the intention analysis result with the connection device information set and determines the home appliance corresponding to the intention among the homogeneous home appliances.

4. The display device of claim 3, wherein the intention analysis result includes a type of a controlled device and a position of the controlled device, and wherein, when the connection device information set includes the type of the controlled device and the position of the controlled device, the processor determines a corresponding controlled device as the home appliance.

5. The display device of claim 4, wherein at least two of the homogenous home appliance items in the displayed homogenous home appliance device list are air purifier devices and the surrounding environmental conditions indicates a dust level surrounding each of the air purifier devices, and wherein the processor is configured to determine that an intention of the voice command of the user is to reduce a fine dust level and display the air purifier devices in an order of decreasing dust level surrounding each of the air purifier devices.

6. The display device of claim 3, wherein the intention analysis result includes a type of a controlled device and the alias of the controlled device, and wherein, when the connection device information set includes the type of the controlled device and the position of the controlled device, the processor determines a corresponding controlled device as the home appliance.

7. The display device of claim 1, wherein the control command includes identification information of the determined home appliance and operation control information of the home appliance according to the intention analysis result.

8. The display device of claim 1, wherein the first server is an IoT server and the second server is a natural language processing server.

9. The display device of claim 1, wherein, when there is no home appliance corresponding to intention of the voice command among the plurality of home appliances, the processor displays notification of device control failure on the display.

10. The display device of claim 1, wherein the first server is an IoT server and the second server is a natural language processing server.

11. A display device comprising:

a display;

a communication interface connected to a first server and a second server, the first server collecting information on each of a plurality of home appliances and the second server acquiring an intention analysis result of a voice command uttered by the user; and a processor configured to obtain a connection device information set including information on each of a plurality of home appliances from the first server, acquire a voice signal corresponding to the voice command uttered by the user, transmit voice data corresponding to the voice signal and the connection device information set to the second server, receive the intention analysis result of the voice command from the second server, and display homogeneous home appliance items corresponding to home appliances having the same function corresponding to intention of the voice command on the display based on the intention analysis result including information indicating that there is a plurality of homogeneous home appliances is received from the second server, wherein a display order of the homogeneous home appliance items displayed on the display is determined based on surrounding environmental conditions in which each of the homogeneous home appliances is located.

12. The display device of claim 11, wherein the processor receives a command for selecting any one item from the homogeneous home appliance items and transmits a control command for controlling a home appliance selected according to the received command to the second server.

13. The display device of claim 11, wherein, when intention of the voice command is related to a power state of a home appliance, the processor displays only a homogeneous home appliance item corresponding to the power state among the homogeneous home appliance items, on the display.

14. The display device of claim 11, wherein, when intention of the voice command is related to a specific function of a home appliance, the processor displays only a homogeneous home appliance item for supporting the specific function among the homogeneous home appliance items, on the display.

15. The display device of claim 14, wherein at least two of the homogenous home appliance items in the displayed homogenous home appliance device list are air purifier devices and the surrounding environmental conditions indicates a dust level surrounding each of the air purifier devices, and wherein the processor is configured to determine that an intention of the voice command of the user is to reduce a fine dust level and display the air purifier devices in an order of decreasing dust level surrounding each of the air purifier devices.

16. The display device of claim 11, wherein the processor determines a display order of the plurality of homogeneous home appliance items based on a distance between the display device and each of the homogeneous home appliances.

17. The display device of claim 11, wherein the processor determines a display order of the plurality of homogeneous home appliance items in an order corresponding to execution of intention of the voice command among the homogeneous home appliances.

\* \* \* \* \*